(12) United States Patent
Yamauchi et al.

(10) Patent No.: US 7,609,746 B2
(45) Date of Patent: Oct. 27, 2009

(54) LIGHT SOURCE DEVICE, IMAGE DISPLAY DEVICE, PROJECTOR, ILLUMINATION DEVICE, AND MONITOR DEVICE

(75) Inventors: Taisuke Yamauchi, Suwa (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 11/987,494

(22) Filed: Nov. 30, 2007

(65) Prior Publication Data

US 2008/0187012 A1    Aug. 7, 2008

(30) Foreign Application Priority Data

Dec. 1, 2006   (JP) .............................. 2006-325369
Nov. 30, 2007  (JP) .............................. 2007-311640

(51) Int. Cl.
   *H01S 3/08* (2006.01)
(52) U.S. Cl. ...................... 372/102; 372/26; 372/50.11
(58) Field of Classification Search ................. 372/102, 372/50.11
   See application file for complete search history.

(56) References Cited

U.S. PATENT DOCUMENTS 6,038,043 A * 3/2000 Bahuguna et al. ............. 359/30
6,868,099 B1 * 3/2005 Walker et al. ................. 372/20

FOREIGN PATENT DOCUMENTS

JP   A-11-064789    3/1999
JP   A-2000-162548  6/2000

* cited by examiner

*Primary Examiner*—Dung T Nguyen
(74) *Attorney, Agent, or Firm*—Oliff & Berridge, PLC

(57) ABSTRACT

A light source device generates irradiation light that is irradiated onto a predetermined face, the light source device including: a laser light source that emits laser light; a diffractive optical element that diffracts the laser light; a diffusion optical element that has an incidence face into which the laser light is incident and a light emission face from which the laser light from the incidence face is emitted, and that diffuses the laser light; and unit structures that are two-dimensionally arrayed on at least one of the incidence face and the light emission face of the diffusion optical element, and that cause the light which is perpendicularly incident into the diffusion optical element to refract at one time, and then emit this light toward the predetermined face.

19 Claims, 22 Drawing Sheets

LIGHT SOURCE DEVICE, IMAGE DISPLAY DEVICE, PROJECTOR, ILLUMINATION DEVICE, AND MONITOR DEVICE

CROSS-REFERENCE TO RELATED APPLICATION

This application is based on and claims priority from Japanese Patent Application No. 2006-325369, filed on Dec. 1, 2006, and Japanese Patent Application No. 2007-311640, filed on Nov. 30, 2007, the contents of which are incorporated herein by reference.

BACKGROUND

1. Technical Field

The present invention relates to a light source device, an image display device, a projector, an illumination device, and a monitor device.

2. Related Art

Technology has been proposed that uses a laser light source in a projection type image display device (i.e., a projector) that uses a projection system to project onto a screen colored light that contains image information generated by a spatial light modulation device such as a liquid crystal device.

This technology is disclosed, for example, in Japanese Unexamined Patent Application, First Publication No. H11-64789, Japanese Unexamined Patent Application, First Publication No. 2000-162548, and the like.

In a projector, an incidence face of the spatial light modulation device must be illuminated by laser light with uniform illumination distribution.

Therefore, it is important to construct an optical system for illuminating the incidence face of the spatial light modulation device with laser light of uniform distribution.

SUMMARY

An advantage of some aspects of the invention is to provide a light source device that is able to generate irradiation light that is able to illuminate a predetermined face with a uniform illumination distribution.

Furthermore, an advantage of some aspects of the invention is to provide an image display device and a projector that display images using irradiation light from a light source device.

Furthermore, an advantage of some aspects of the invention is to provide an illumination device and a monitor device that use irradiation light from a light source device.

In order to solve the above described problems, the invention employs the following structures.

A first aspect of the invention provides a light source device that generates irradiation light that is irradiated onto a predetermined face, the light source device including: a laser light source that emits laser light; a diffractive optical element that is located between the laser light source and the predetermined face, and that diffracts the laser light; a diffusion optical element that is located between the laser light source and the predetermined face, and that has an incidence face into which the laser light is incident and a light emission face from which the laser light from the incidence face is emitted, and that diffuses the laser light; and unit structures that are two-dimensionally arrayed on at least one of the incidence face and the light emission face of the diffusion optical element, and that cause the light which is perpendicularly incident into the diffusion optical element to refract at one time, and then emit this light toward the predetermined face.

According to the first aspect of the invention, it is possible to generate irradiation light that is capable of illuminating the predetermined face with a uniform illumination distribution by diffusing laser light from the laser light source using the diffusion optical element.

In the diffusion optical element, because a structure is employed in which a plurality of unit structures that cause the light which is perpendicularly incident into the diffusion optical element to refract at one time and then emit this light toward the predetermined face are two-dimensionally arrayed on at least one of the incidence face and the light emission face, it is possible to restrict attenuation of the quantity of laser light (i.e., irradiation light) that reaches the predetermined face, and illuminate the predetermined face with a high level of illumination.

It is preferable that, in the light source of the invention, the shape of the unit structures be set so that directions of travel of the laser light that is emitted from each of positions of the unit structure are mutually different.

By employing this structure, laser light can be excellently diffused.

It is preferable that, in the light source of the invention, the shape of the unit structures be set so that the laser light that has passed through the diffractive optical element and the diffusion optical element is incident at a predetermined incidence angle into a predetermined area of the predetermined face.

By employing this structure, a predetermined face can be illuminated in a desired state.

It is preferable that, in the light source of the invention, the unit structures include at least one of recessed portions and protruding portions.

By employing this structure, laser light can be excellently diffused.

It is preferable that, in the light source of the invention, the unit structures include at least one of recessed portions and protruding portions that are two-dimensionally and regularly arrayed along a face which is substantially parallel to the light emission face.

By employing this structure, a predetermined face can be illuminated with a uniform illumination distribution.

It is preferable that, in the light source of the invention, the unit structures include at least one of recessed portions and protruding portions whose surfaces are shaped as curved surfaces.

By employing this structure, a predetermined face can be illuminated with a uniform illumination distribution.

It is preferable that, in the light source of the invention, the unit structures include arc-shaped grooves which are depressed relative to the predetermined face in a cross-sectional view which is substantially perpendicular to the light emission face, and the grooves are formed in a predetermined direction of the face that is substantially perpendicular to the light emission face.

By employing this structure, laser light emitted from a light emission face is led to arrive at a predetermined face.

It is preferable that, in the light source of the invention, the diffusion optical element diffuse laser light by refracting the laser light at the incidence face, and the incidence face have a shape that controls the direction of travel of the laser light so that the post-incident laser light travels toward the light emission face.

By employing this structure, it is possible to suppress any attenuation in the quantity of laser light (i.e., irradiation light) that reaches a predetermined face, and it is possible to illuminate the predetermined face with a high level of illumination.

A second aspect of the invention provides a light source device that generates irradiation light that is irradiated onto a predetermined face, the light source device including: a laser light source that emits laser light; a diffractive optical element that is located between the laser light source and the predetermined face, and that diffracts the laser light; a diffusion optical element that is located between the laser light source and the predetermined face, and that has both an incidence face into which the laser light is incident and which has a shape that controls the direction of travel of the laser light so that the post-incident laser light travels toward the light emission face, and a light emission face from which the laser light from the incidence face is emitted, and that diffuses the laser light by refracting the laser light at the incidence face.

According to the second aspect of the invention, it is possible to generate irradiation light that is capable of illuminating the predetermined face with a uniform illumination distribution by diffusing laser light from a laser light source using a diffusion optical element.

Because a diffusion optical element is able to diffuse laser light by refracting it on the incidence face, and the incidence face has a shape that enables it to control the direction of travel of the laser light so that the incident laser light travels toward a light emission face, it is possible to restrict attenuation of the quantity of laser light (i.e., irradiation light) that reaches a predetermined face, and illuminate the predetermined face with a high level of illumination.

It is preferable that, in the light source of the invention, the diffusion optical element be located between the diffractive optical element and the predetermined face, and the laser light from the diffractive optical element is incident into the incidence face of the diffusion optical element.

By employing this structure, because diffracted light from laser light that has been generated by a diffractive optical element is diffused by a diffusion optical element, it is possible to illuminate a predetermined face with a uniform illumination distribution.

It is preferable that the light source of the invention further include a drive apparatus that moves the diffusion optical element relative to the laser light.

By employing this structure, it is possible to diffuse laser light even more excellently and illuminate a predetermined face with a uniform illumination distribution.

It is preferable that the light source of the invention further include an anti-reflection structure provided on at least one of the incidence face and the light emission face.

By employing this structure, it is possible to further suppress any attenuation in the quantity of laser light (i.e., irradiation light) that reaches a predetermined face, and illuminate the predetermined face with a high level of illumination.

A third aspect of the invention provides a light source device that generates irradiation light that is irradiated onto a predetermined face, the light source device including: a laser light source that emits laser light; a diffractive optical element that is located between the laser light source and the predetermined face, and that diffracts the laser light; and a diffusion optical element that is located between the laser light source and the predetermined face, and that has an incidence face into which the laser light is incident and a light emission face from which the laser light from the incidence face is emitted, and that diffuses the laser light. In the light source device, unit structures that include at least one of recessed portions and protruding portions whose surfaces are shaped as curved surfaces and that are two-dimensionally arrayed on at least one of the incidence face and the light emission face of the diffusion optical element.

According to the third aspect of the invention, because at least one of the incidence face and the light emission face of the diffusion optical element is formed by two-dimensionally arraying a plurality of unit structures that include at least one of recessed portions and protruding portions whose surfaces are shaped as curved surfaces, it is possible to restrict attenuation of the quantity of laser light (i.e., irradiation light) that reaches a predetermined face, and illuminate the predetermined face with a high level of illumination.

It is preferable that, in the light source of the invention, an angle between an optical axis of light that is emitted from the light emission face of the diffusion optical element and a normal line of the light emission face be less than or equal to 1.2°.

By employing this structure, it is possible to illuminate a predetermined face with a high level of illumination.

It is preferable that, in the light source of the invention, if a radius of a circle forming a diffusion range of the light which is created by the diffusion optical element is taken as "d", and if a length of a diagonal line of a rectangle forming an illumination area on the predetermined face is taken as "L", then a formula $2d \leq L$ be satisfied for light that is incident into a center of the illumination area on the predetermined face when the diffusion optical element is not provided.

By employing this structure, it is possible to satisfactorily restrict light loss.

It is preferable that, in the light source of the invention, if a radius of a circle forming a diffusion range of the light which is created by the diffusion optical element is taken as "d", and if a length of a short side of a rectangle forming an illumination area on the predetermined face is taken as "S", then a formula $2d \leq S$ be satisfied for light that is incident into a center of the illumination area on the predetermined face when the diffusion optical element is not provided.

By employing this structure, it is possible to satisfactorily restrict light loss.

A fourth aspect of the invention provides an image display device in which irradiation light is radiated from the light source device described above, and an image is displayed by light that has passed through the predetermined face.

According to the fourth aspect of the invention, it is possible to obtain a desired image from irradiation light that has passed through a predetermined face which is illuminated in a desired state.

It is preferable that, in the image display device, the predetermined face include an incidence face of a spatial light modulation device that optically modulates the irradiated light in accordance with image signals.

By employing this structure, it is possible to display a desired image.

A fifth aspect of the invention provides a projector including the image display device described above; a display screen; and a projection system that projects onto the display screen light that contains image information and has passed through the predetermined face.

By employing this structure, it is possible to form a superior image.

A sixth aspect of the invention provides an illumination device including the light source device described above.

According to the sixth aspect of the invention it is possible to illuminate a predetermined face with a uniform illumination distribution using irradiation light having a high level of illumination.

A seventh aspect of the invention provides a monitor device including the light source device described above.

According to the seventh aspect of the invention, it is possible to illuminate an object using irradiation light having a high level of illumination, and to desirably monitor this object.

BRIEF DESCRIPTION OF THE DRAWINGS

FIG. 3A is a plan view thereof, and FIG. 3B is a cross-sectional view taken along the line A-A in FIG. 3A.

DESCRIPTION OF EXEMPLARY EMBODIMENTS

Hereinafter, embodiments of the invention will be described with reference made to the drawings.

In the following description, positional relationships between respective members are described while referring to an XYZ linear coordinate system.

In addition, a predetermined direction within a horizontal plane is taken as the X direction, a direction which is orthogonal to the X direction within the horizontal plane is taken as the Y direction, and a direction which is orthogonal to both the X direction and the Y direction (namely a vertical direction) is taken as a Z direction.

In addition, rotational (i.e., inclined) directions around an X axis, a Y axis, and a Z axis are taken respectively as $\theta X$, $\theta Y$, and $\theta Z$ directions.

First Embodiment

A first embodiment will be described.

Figure 1:
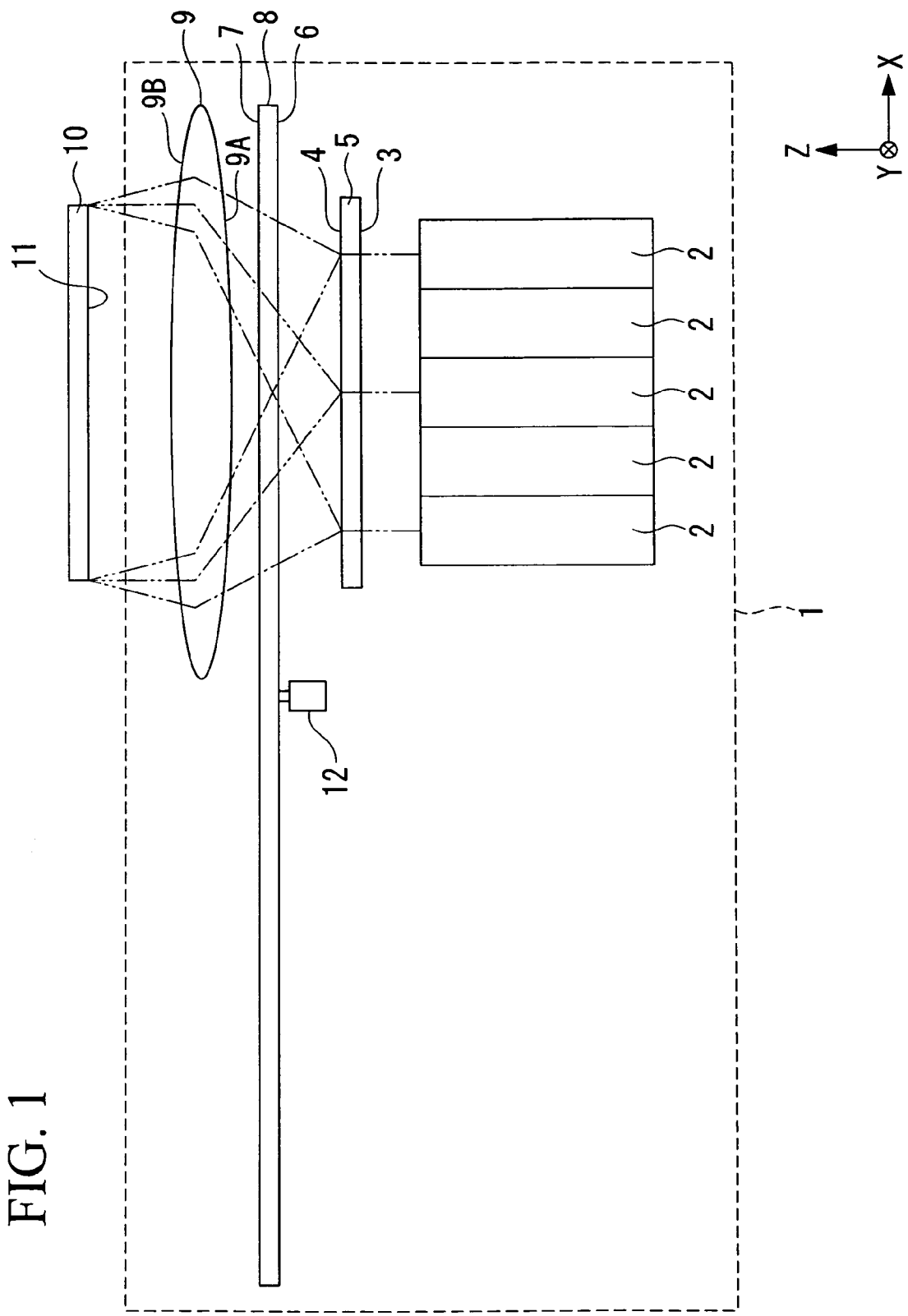
FIG. 1 is a schematic structural view showing a light source device according to a first embodiment.
Figure 2:
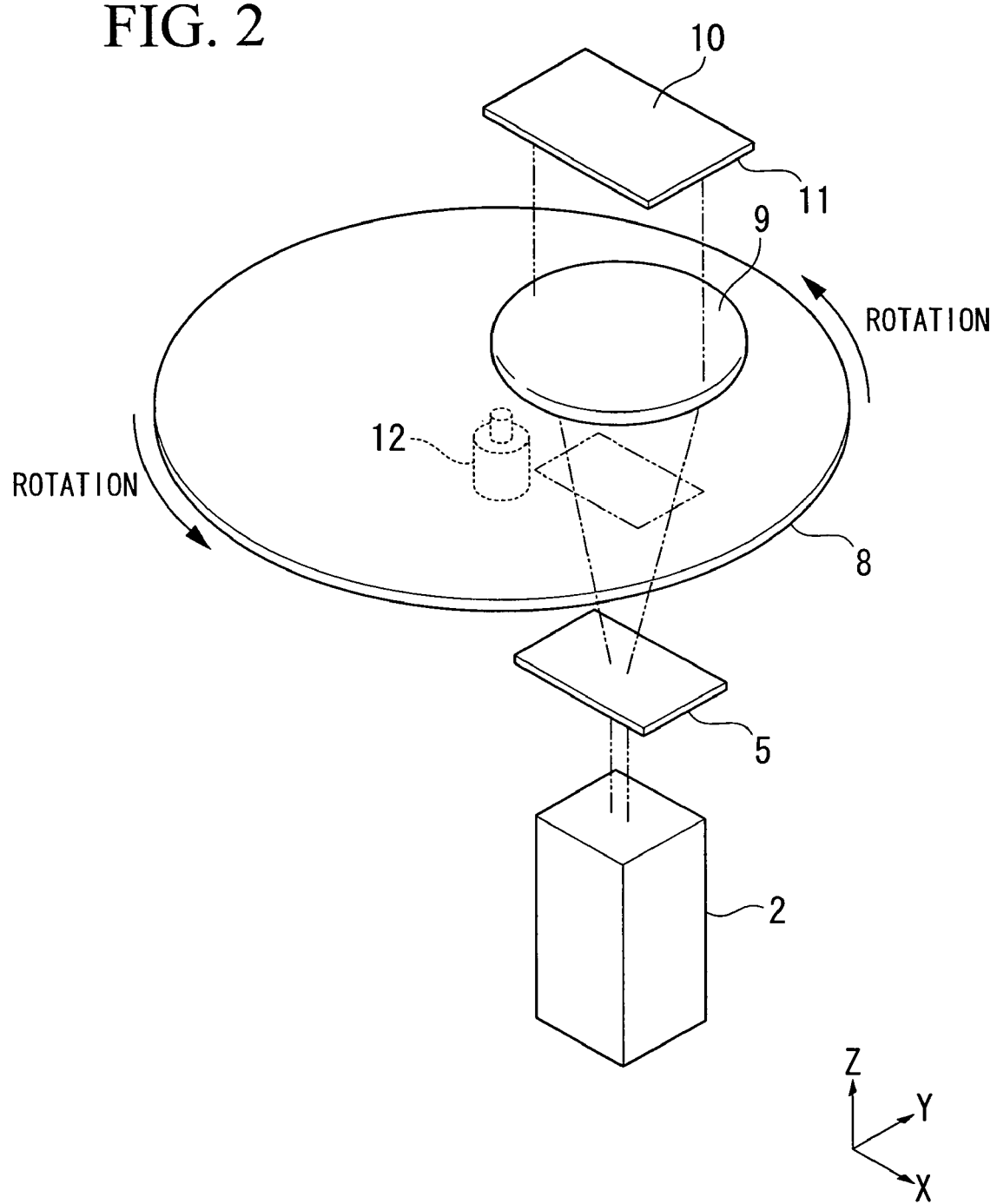
FIG. 2 is a schematic perspective view showing a light source device according to the first embodiment.

FIG. 1 is a schematic structural view showing a light source device 1 according to the first embodiment. FIG. 2 is a schematic perspective view showing FIG. 1.

In FIGS. 1 and 2, the light source device 1 generates irradiation light for irradiation onto a predetermined face 11 of a predetermined member 10. The light source device 1 has a laser light source 2, a diffractive optical element 5, a diffusion optical element 8, and an angle adjusting optical element 9.

The laser light source 2 emits laser light. The diffractive optical element 5 has an incidence face 3 where laser light enters and a light emission face 4 from which the laser light from the incidence face 3 is emitted, and is located between the laser light source 2 and the predetermined face 11. The diffractive optical element 5 diffracts laser light emitted from the laser light source 2. The diffusion optical element 8 has an incidence face 6 where laser light enters and a light emission face 7 from which the laser light from the incidence face 6 is emitted, and is located between the laser light source 2 and the predetermined face 11. The diffusion optical element 8 diffuses laser light. The angle adjusting optical element 9 has an incidence face 9A where laser light enters and a light emission face 9B from which laser light from the incidence face 9A is emitted, and is located between the laser light source 2 and the predetermined face 11. The angle adjusting optical element 9 adjusts the emission angle of laser light.

In this embodiment, the diffractive optical element 5 is located between the laser light source 2 and the diffusion optical element 8, and the diffusion optical element 8 is located between the diffractive optical element 5 and the predetermined face 11.

The angle adjusting optical element 9 is located between the diffusion optical element 8 and the predetermined face 11.

The laser light source 2 emits laser light.

In this embodiment, a plurality of laser light sources 2 are provided, and light emitting surfaces of each laser light source 2 face toward the +Z side.

Moreover, in this embodiment, the plurality of laser light sources 2 are lined up in a row in a one-dimensional direction (i.e., in the X-axial direction in the example shown in FIG. 1).

Each of the plurality of laser light sources 2 irradiates onto the incidence face 3 of the diffractive optical element 5 with laser light.

The diffractive optical element 5 diffracts the laser light which has been incident into the incidence face 3 so as to create diffractive light, which is then emitted from the light emission face 4.

In this embodiment, the laser light from the laser light source 2 is irradiated onto the incidence face 3 of the diffractive optical element 5.

The diffractive optical element 5 is formed from a material that is able to transmit laser light such as, for example, from quartz (i.e., glass), a transparent synthetic resin, or the like.

The diffractive optical element 5 of this embodiment contains a computer-generated hologram (CGH).

The diffractive optical element 5 (i.e., the hologram element) has an illumination area setting function, a diffused light generating function (i.e., an illumination uniformization function), and an enlarged illumination function.

The light source device 1 that includes the diffractive optical element 5 which has an illumination area setting function illuminates a predetermined illumination area of the predetermined face 11 with the laser light based on the laser light emitted from the laser light source 2.

Moreover, the light source device 1 that includes the diffractive optical element 5 which has a diffused light generating function uniformizes the illumination of at least a portion of the illumination area of the predetermined face 11.

Moreover, the light source device 1 that includes the diffractive element 5 which has an enlarged illumination function illuminates a larger illumination area of the predetermined face 11 than the emission area where light from the light emission face 4 of the diffractive optical element 5 is emitted.

Figure 3A:
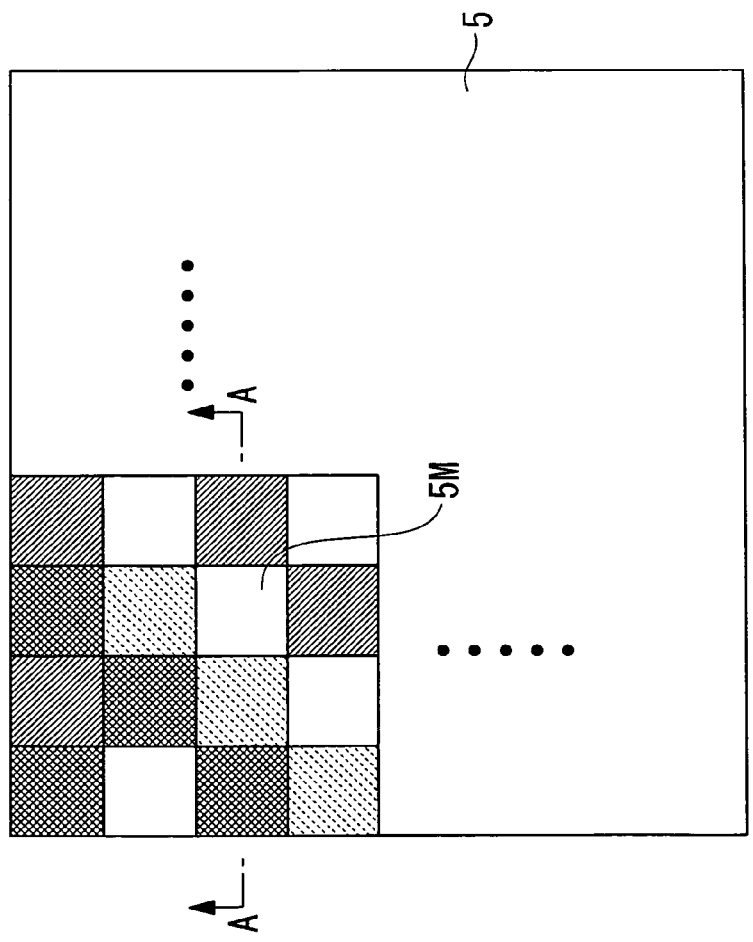
FIGS. 3A and 3B are schematic views showing an example of a diffractive optical element.
Figure 3B:
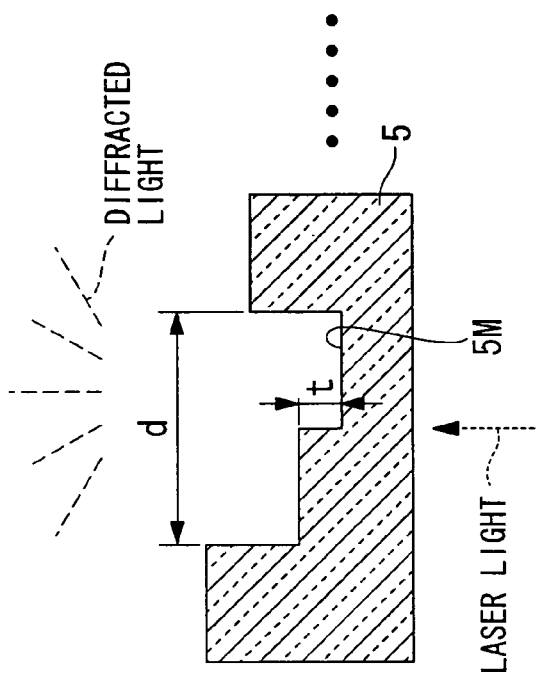

FIGS. 3A and 3B are schematic views showing an example of a diffractive optical element, FIG. 3A is a plan view while FIG. 3B is a cross-sectional view taken along a line A-A in FIG. 3A.

In FIGS. 3A and 3B, the diffractive optical element 5 has on its surface a plurality of rectangular recessed portions 5M (i.e., an uneven structure).

The recessed portions 5M all have a different depth from each other.

Moreover, the plurality of protruding portions which is located between the respective recessed portions 5M also all has a different height from each other.

In addition, by appropriately adjusting the surface conditions of the diffractive optical element 5 including a pitch d between the recessed portions 5M as well as the depth t (i.e., the height of the protruding portions) of the recessed portions 5M, predetermined functions (i.e., the illumination area setting function, the diffused light generating function, and the enlarged illumination function) can be imparted to the diffractive optical element 5.

Examples of the design method that is used to optimize these surface conditions include predetermined computation methods (i.e., simulation methods) such as an inverse Fourier transform method.

The diffractive optical element 5 is not limited to it having the rectangular recessed portions 5M, and it may also have a surface that is formed from a combination of planes that all face in a different direction from each other.

Figure 4:
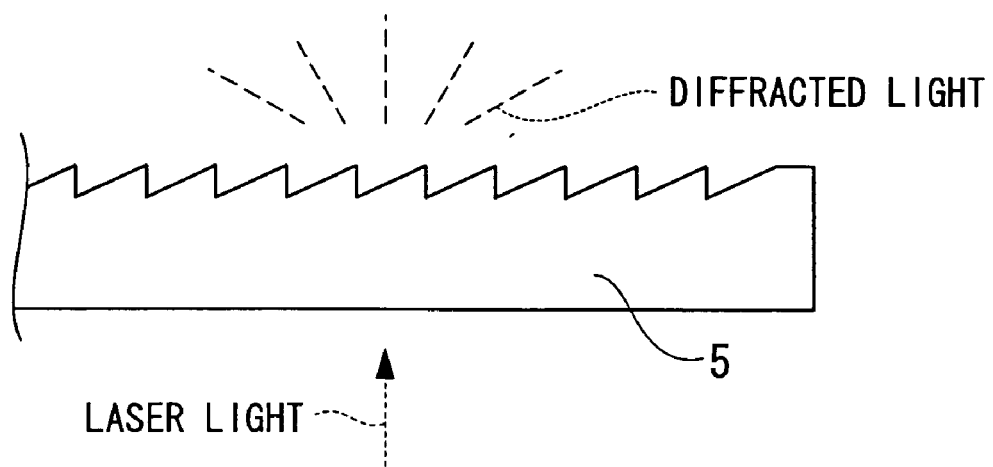
FIG. 4 is a schematic view illustrating an example of a diffractive optical element.

For example, the diffractive optical element 5 may also have triangular recessed portions that have inclined surfaces such as shown in FIG. 4.

Moreover, the diffractive optical element 5 may also be one that has both an area having the rectangular recessed portions 5M such as are shown in FIGS. 3A and 3B and an area having triangular recessed portions such as are shown in FIG. 4.

In addition, by optimizing the surface conditions thereof, it is possible to form a diffractive optical element 5 having the desired functions.

Next, a description of the diffusion optical element 8 will be explained.

The diffusion optical element 8 diffuses laser light that has been incident into the incidence face 6 so as to create diffused light, which is then emitted from the light emission face 7.

In this embodiment, laser light that is emitted from the light emission face 4 of the diffractive optical element 5 is irradiated onto the incidence face 6 of the diffusion optical element 8.

The diffusion optical element 8 is formed from a material that is able to transmit laser light such as, for example, quartz (i.e., glass), a transparent synthetic resin, or the like.

In this embodiment, the diffusion optical element 8 refracts laser light using the light emission face 7 so as to thereby diffuse this laser light.

Figure 5:
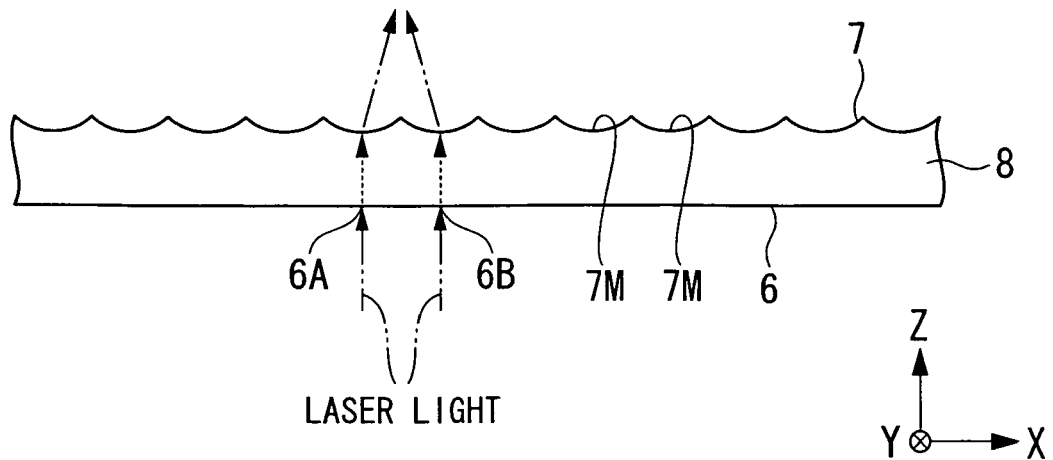
FIG. 5 is an enlarged side view showing a portion of a diffusion optical element according to the first embodiment.
Figure 6:
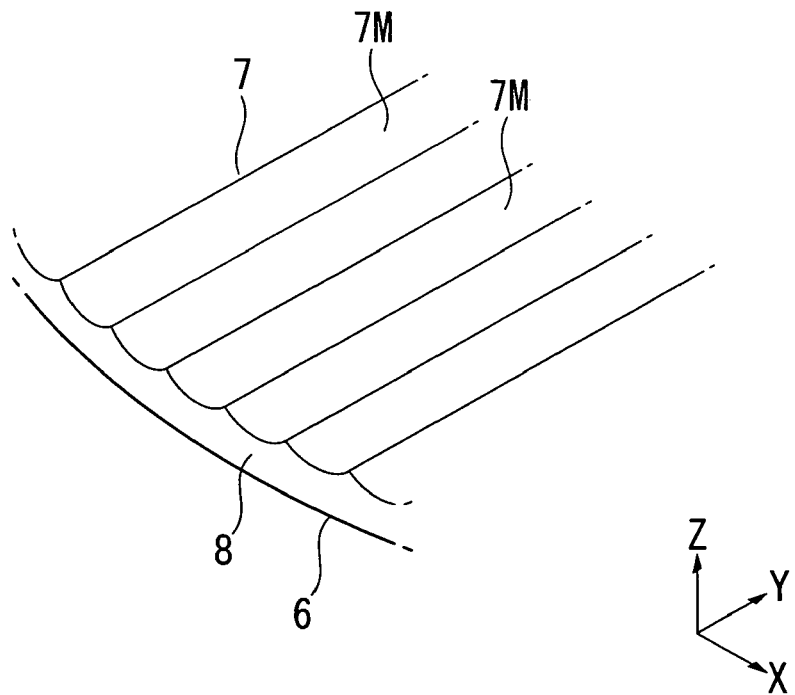
FIG. 6 is an enlarged perspective view showing a portion of a diffusion optical element according to the first embodiment.

FIG. 5 is an enlarged side view showing a portion of the diffusion optical element 8 according to this embodiment. FIG. 6 is an enlarged perspective view showing a portion of the diffusion optical element 8 according to this embodiment.

As shown in FIG. 5, the diffusion optical element 8 diffuses laser light by refracting it using the light emission face 7.

The light emission face 7 of the diffusion optical element 8 of this embodiment has a shape that enables it to control the direction in which the laser light travels so that the laser light does not re-enter the light emission face 7 after being emitted therefrom.

Namely, in this embodiment, the shape of the light emission face 7 is optimized so that laser light does not re-enter the light emission face 7 after it has been emitted therefrom, but travels toward the predetermined face 11 (i.e., the angle adjusting optical element 9).

The shape of the light emission face 7 (i.e., grooves 7M which are described below) are set so that the directions of travel of the laser light that is emitted from each of positions of this light emission face (i.e., the grooves 7M) are mutually different.

The laser light that is emitted from each of the plurality of positions of the light emission face 7 is refracted by this light emission face 7 so that the laser lights travel in mutually different directions.

For example, as shown in FIG. 5, laser light that is incident in a substantially vertical direction into a first position 6A of the incidence face 6 passes through the diffusion optical element 8, and is then refracted by the light emission face 7. It is then emitted from the light emission face 7 so as to travel in a first direction.

Laser light that is incident in a substantially vertical direction into a second position 6B of the incidence face 6 which is different from the first position 6A passes through the diffusion optical element 8, and is then refracted by the light emission face 7. It is then emitted from the light emission face 7 so as to travel in a second direction which is different from the first direction.

In this manner, in this embodiment, the light emission face 7 has a shape that enables it to mutually change the directions of travel of laser light that is emitted from each of positions of the light emission face 7.

Moreover, the light emission face 7 controls the direction of travel of the laser light so that the laser light does not re-enter the light emission face 7 after being emitted therefrom, and this laser light is refracted once by the light emission face 7 and then travels toward the predetermined face 11 (i.e., the angle adjusting optical element 9).

In this embodiment, the light emission face 7 includes an uneven structure, and laser light that is emitted from each of positions of the light emission face 7 is refracted by the light emission face 7 that includes at least one of a concave portion and a convex portion so as to travel in mutually different directions.

As shown in FIGS. 5 and 6, in this embodiment, the light emission face 7 includes arc-shaped grooves 7M which are depressed relative to the predetermined face 11 (i.e., the angle adjusting optical element 9) in a cross-sectional view which is substantially perpendicular to this light emission face 7.

In the case of this embodiment, the grooves 7M correspond to the "unit structures" of the invention.

A plurality of grooves 7M are formed in a predetermined direction in a surface which is substantially parallel to the light emission face 7.

In FIGS. 5 and 6, the diffusive light emitting element 8 is disposed so that the incidence face 6, the light emission face 7, and an XY plane are all substantially parallel.

The light emission face 7 has arc-shaped grooves 7M that are depressed relative to the predetermined face 11 on an XZ plane which is substantially perpendicular to the light emission face 7.

The grooves 7M are formed in elongated lines extending in the Y axial direction, and a plurality of the grooves 7M are formed in the X axial direction.

In this manner, in this embodiment, the grooves 7M are arc-shaped and are depressed on an XZ plane toward the predetermined face 11, and have a linear shape that extends in the Y axial direction, and a plurality of these grooves 7M are formed in the X axial direction.

Moreover, boundaries between adjacent grooves 7M protrude toward the predetermined face 11 (i.e., the angle adjusting optical element 9) so as to form ridge lines.

Moreover, in this embodiment, the incidence face 6 is a plane which is substantially parallel to the XY plane.

As shown in FIG. 1, the light source device 1 includes a driving device 12 that drives the diffusion optical element 8 relative to the laser light.

The driving device 12 includes a rotation motor capable of rotating the diffusion optical element 8, and is able to rotate the diffusion optical element 8 in the θZ direction.

As a result of being rotated by the driving device 12, the diffusion optical element 8 is able to uniformize the illumination distribution of at least a portion of the illumination area on the predetermined face 11.

The driving device 12 can be constructed so that it is able to move (i.e., to move in micro-steps or to swing) the diffusion optical element 8 at least in the X axial, the Y axial, the Z axial, the θX, and the θY directions.

The angle adjusting optical element 9 adjusts the incidence angle of the laser light that enters through the incidence face 9A, and emits this laser light outside through the light emission face 9B.

In this embodiment, laser light that has been emitted from the light emission face 7 of the diffusion optical element 8 is irradiated onto the incidence face 9A of the angle adjusting optical element 9.

In this embodiment, the angle adjusting optical element 9 is a refractive lens (i.e., a field lens).

A refractive lens includes, for example, a spherical lens, or an axis objective lens which has rotational symmetry relative to the optical axis of an aspherical lens or the like.

Alternatively, the angle adjusting optical element 9 may also include a Fresnel lens.

The angle adjusting optical element 9 is able to adjust the emission angle of the laser light emitted from the light emission face 9B, and consequently the incidence angle of the laser light (i.e., the irradiation light) relative to the predetermined face 11.

In this embodiment, the angle adjusting optical element 9 adjusts the emission angle of the laser light (i.e., the irradiation light) emitted by the light emission face 9B so that a predetermined area on the predetermined face 11 is overlappingly illuminated with laser light that has been emitted from each of the plurality of laser light sources 2 and has passed through the diffractive optical element 5 and the diffusion optical element 8.

Next, an example of the operation of the light source device 1 will be described.

The laser light that has been emitted from each of the plurality of laser light sources 2 is incident into the incidence face 3 of the diffractive optical element 5, and passes through this diffractive optical element 5. The laser light is then emitted from the light emission face 4 of the diffractive optical element 5.

The diffractive optical element 5 creates diffracted light from the laser light that has been incident into the incidence face 3, and then emits it from the light emission face 4.

The laser light (i.e., the diffracted light) that is emitted from the light emission face 4 of the diffractive optical element 5 is incident into the incidence face 6 of the diffusion optical element 8, and passes through this diffusion optical element 8. The laser light is then emitted from the light emission face 7 of the diffusion optical element 8.

The diffusion optical element 8 creates diffused light from the laser light which has been incident into the incidence face 6, and then emits it from the light emission face 7.

The laser light (i.e., the diffused light) that is emitted from the light emission face 7 of the diffusion optical element 8 is incident into the incidence face 9A of the angle adjusting optical element 9, and passes through this angle adjusting optical element 9. The laser light is then emitted from the light emission face 9B of the angle adjusting optical element 9.

The angle adjusting optical element 9 adjusts the emission angle of laser light that has entered via the incidence face 9A, and emits this light from the light emission face 9B.

The laser light emitted from the light emission face 9B of the angle adjusting optical element 9 is irradiated onto the predetermined face 11.

In this embodiment, the light source device 1 which includes the diffractive optical element 5 and the diffusion optical element 8 illuminates a predetermined illumination area of the predetermined face 11.

The shape of the light emission face 7 is set so that laser light that has passed through the diffractive optical element 5 and the diffusion optical element 8 is incident into the predetermined area of the predetermined face 11 at a predetermined incidence angle.

Figure 7:
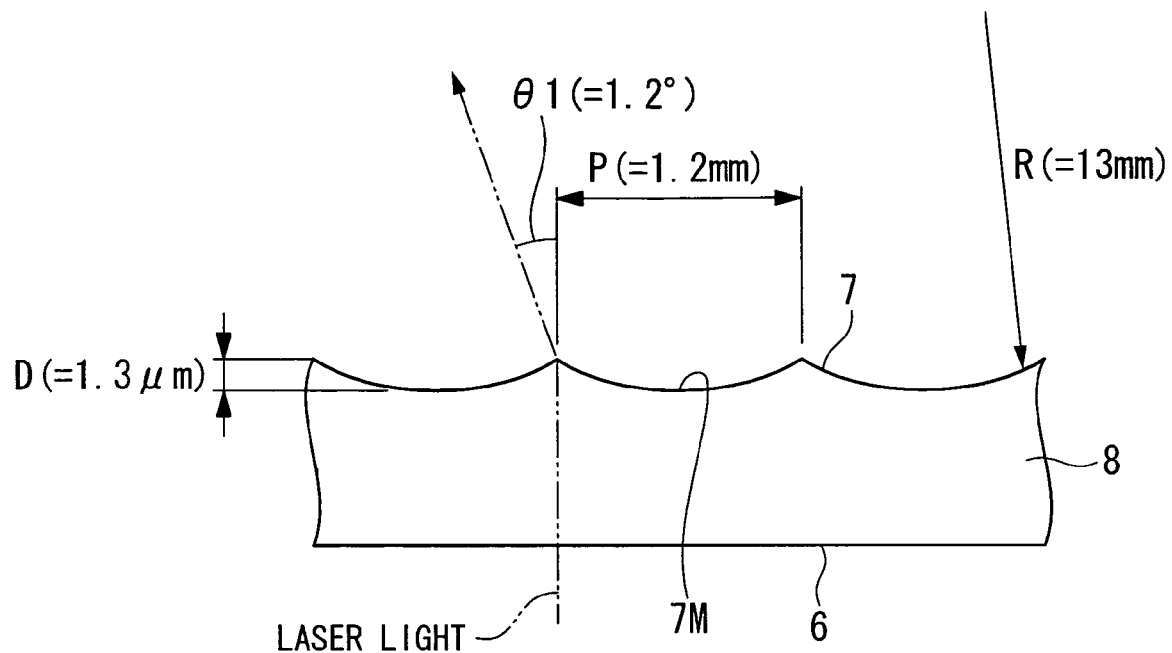
FIG. 7 is an enlarged side view showing a portion of a diffusion optical element according to the first embodiment.

FIG. 7 is an enlarged view of the diffusion optical element 8.

In this embodiment, as an example, a radius of curvature R of the arc-shaped grooves 7M is set at 13 mm, a distance P (i.e., pitch) between adjacent grooves 7M is set at approximately 1.2 mm, and a depth D of the grooves 7M is set at approximately 13 μm.

Laser light which enters substantially perpendicularly to the incidence face 6 which is substantially parallel to the XY plane passes through the diffusion optical element 8, and is refracted by the light emission face 7 causing it to travel in a predetermined direction.

An emission angle θ1 of the laser light emitted from the light emission face 7 differs depending on the position on the light emission face 7, however, in this embodiment, the shape of the light emission face 7 is set so that the emission angle $\theta 1$ is between $-1.2°$ and $+1.2°$.

Here, the emission angle $\theta 1$ is the angle in which the laser light, which is substantially perpendicularly incident into the incidence face 6, extends, namely, is the angle formed by the Z axis.

In order to make the drawings easier to view, sizes and angles shown in the drawings differ from the actual sizes and angles.

Figure 8:
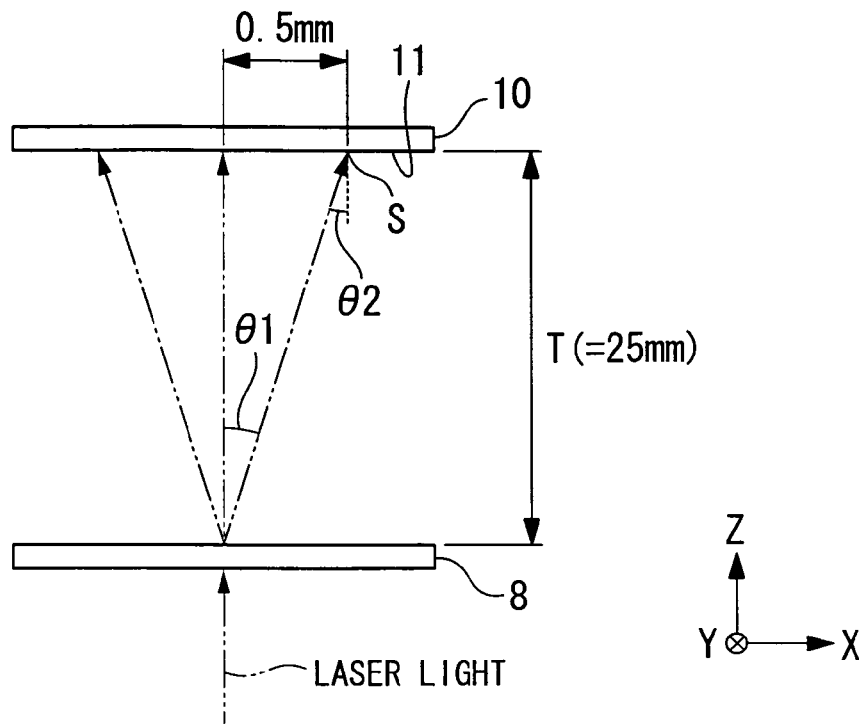
FIG. 8 is a schematic view showing a positional relationship between a diffusion optical element and a predetermined face.
Figure 9:
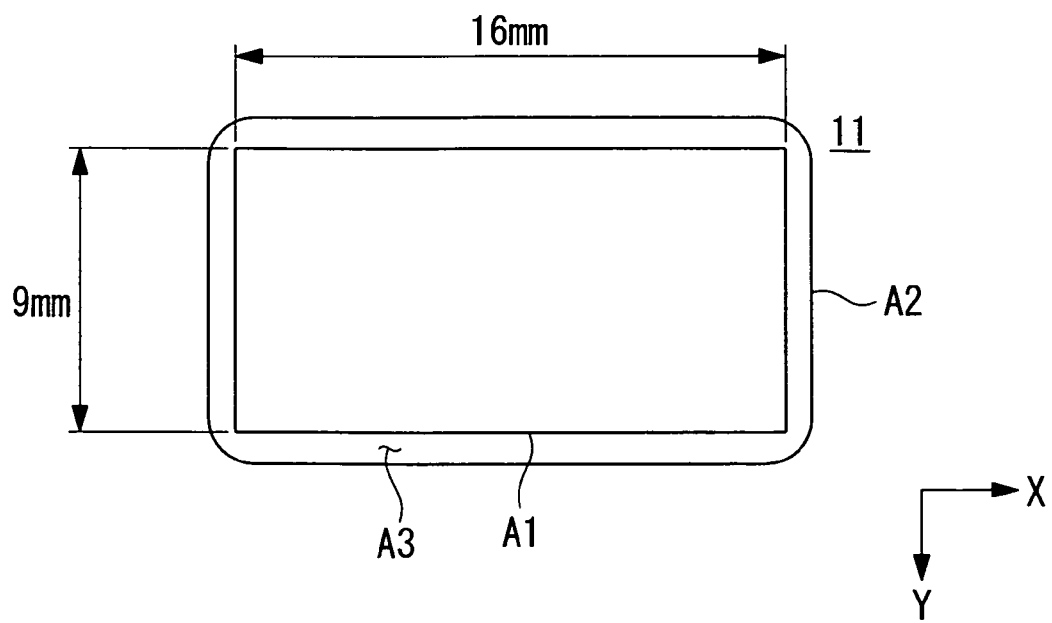
FIG. 9 is a schematic view showing an example of a state of a predetermined face.

FIG. 8 is a schematic view showing a positional relationship between the diffusion optical element 8 and the predetermined member 10 having the predetermined face 11, while FIG. 9 is a schematic view showing the predetermined face 11 onto which irradiation light is irradiated by the light source device 1.

As shown in FIG. 8, the light emission face 7 of the diffusion optical element 8 and the predetermined face 11 of the predetermined member 10 are substantially parallel to the XY plane.

In the example shown in FIG. 8, a distance T between the light emission face 7 of the diffusion optical element 8 and the predetermined face 11 of the predetermined member 10 is set at approximately 25 mm.

Laser light emitted at the emission angle $\theta 1$ from the light emission face 7 is incident into the predetermined face 11 at an angle $\theta 2$.

Here, the light emission face 7 of the diffusion optical element 8 is parallel to the predetermined face 11 of the predetermined member 10.

Accordingly, the emission angle $\theta 1$ of the laser light emitted from the light emission face 7 is substantially the same as the incidence angle $\theta 2$ of the laser light which is incident into the predetermined face 11.

Because it is possible to control the emission angle $\theta 1$ by adjusting the shape of the light emission face 7, it is also possible to control the incidence angle $\theta 2$ of the laser light relative to the predetermined face 11 by adjusting the shape of the light emission face 7.

In this manner, by adjusting the shape of the light emission face 7, it is possible to set the incidence angle of the laser light relative to the predetermined face 11.

In this embodiment, because the angle adjusting optical component 9 is provided, it is also possible to adjust the angle of incidence $\theta 2$ using this angle adjusting optical element 9.

When the emission angle $\theta 1$ is between $-1.2°$ and $+1.2°$, then if a position where an extension line of the laser light that is substantially perpendicularly incident into the incidence face 6 intersects with the predetermined face 11 is taken as a reference point, as shown in FIG. 8, based on this laser light, a position S where the laser light emitted by the light emission face 7 arrives at the predetermined face 11 is within a range of approximately $-0.5$ mm to $+0.5$ mm.

In FIG. 9, in this embodiment, the light source device 1 illuminates at least a rectangular-shaped predetermined area A1 (i.e., an illumination area) of the predetermined face 11 with irradiation light.

The diffractive optical element 5 is set so that laser light is irradiated onto the predetermined area A1.

In this embodiment, the size in the X axial direction of the predetermined area A1 is 16 mm, and the size thereof in the Y axial direction is 9 mm.

The shape of the light emission face 7 is set so that laser light that has passed through the diffractive optical element 5 and the diffusion optical element 8 is incident into the predetermined area A1 of the predetermined face 11 at the predetermined incidence angle $\theta 2$.

As described with reference to FIG. 8 and the like, the laser light is emitted from the light emission face 7 at the emission angle $\theta 1$.

Because the emission angle $\theta 1$ of the laser light emitted from the light emission face 7 varies depending on the position on the light emission face 7, the laser light that is emitted from each of positions on the light emission face 7 is mixed together at the predetermined face 11 so that the illumination in the predetermined area A1 is uniformized.

In this embodiment, the shape (including the radius of curvature R of the grooves 7M, the pitch P, and the depth D) of the light emission face 7, and the distance T between the light emission face 7 and the predetermined face 11 are optimized so that the illumination in at least the predetermined area A1 is uniformized, namely, so that the laser light that is emitted from each of positions on the light emission face 7 is mixed together in the predetermined area A1 of the predetermined face 11.

A portion of the laser light that is emitted from each of positions on the light emission face 7, such as, for example, the laser light that is emitted from the vicinity of edges of the light emission area of the light emission face 7, does not become mixed together with the other laser light at the predetermined face 11 and is irradiated onto an area A3 outside the predetermined area A1.

Namely, as shown in FIG. 9, in this embodiment, an illumination area A2 that is set by the light source device 1 includes the predetermined area A1 and is larger than the predetermined area A1.

In addition, the illumination of at least that portion of the illumination area A2 that corresponds to the predetermined area A1 (i.e., the area excluding the area A3) is uniformized.

In this embodiment, the shape (including the radius of curvature R of the grooves 7M, the pitch P, and the depth D) of the light emission face 7, and the distance T between the light emission face 7 and the predetermined face 11 are optimized so that the illumination in the predetermined area A1 which is the illumination subject area of the illumination area A2 is uniformized.

In this embodiment, any non-uniformity in the illumination distribution at the predetermined face 11 that is caused, for example, by the luminance distribution of the laser light emitted from the light emission face 4 of the diffractive optical element 5 can be uniformized by the diffusion optical element 8.

Figure 10:
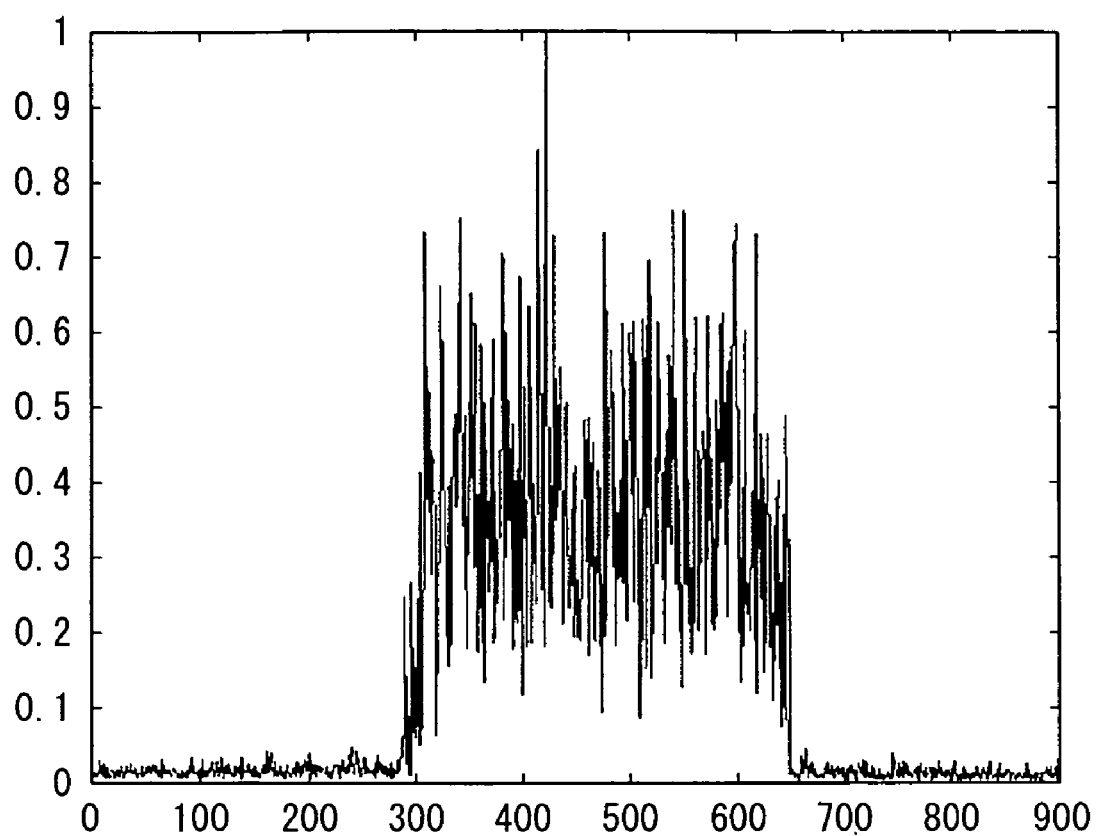
FIG. 10 is a view showing an example of a luminance distribution of a diffractive optical element.

For example, as shown in FIG. 10, there is a possibility of polarization occurring in the luminance distribution of the laser light that is emitted from the light emission face 4 of the diffractive optical element 5 that is caused by the processing and the like when the diffractive optical element 5 is being manufactured.

The horizontal axis in FIG. 10 shows the values when the position in the X axial direction of the diffractive optical element 5 is normalized, and the vertical axis shows values when the luminance (i.e., the illumination) is normalized.

In this manner, even if polarization occurs in the luminance (i.e., illumination) distribution of the laser light that is emitted from the light emission face 4 of the diffractive optical element 5, according to this embodiment, the illumination distribution of the laser light (i.e., the irradiation light) can be uniformized at the predetermined face 11 by the diffusion optical element 8.

As described above, according to this embodiment, as a result of laser light from the laser light source 2 being diffused by the diffusion optical element 8, it is possible to create irradiation light that is capable of illuminating the predetermined face 11 with a uniform illumination distribution.

Because the diffusion optical element 5 diffuses laser light by refracting the laser light using the light emission face 7, and because this light emission face 7 has a shape that allows it to control the direction of travel of the laser light so that the laser light does not re-enter the light emission face 7 after having been emitted therefrom, it is possible to suppress any attenuation in the amount of laser light (i.e., irradiation light) that reaches the predetermined face 11, and it is possible to illuminate the predetermined face 11 with a high level of illumination.

Figure 11:
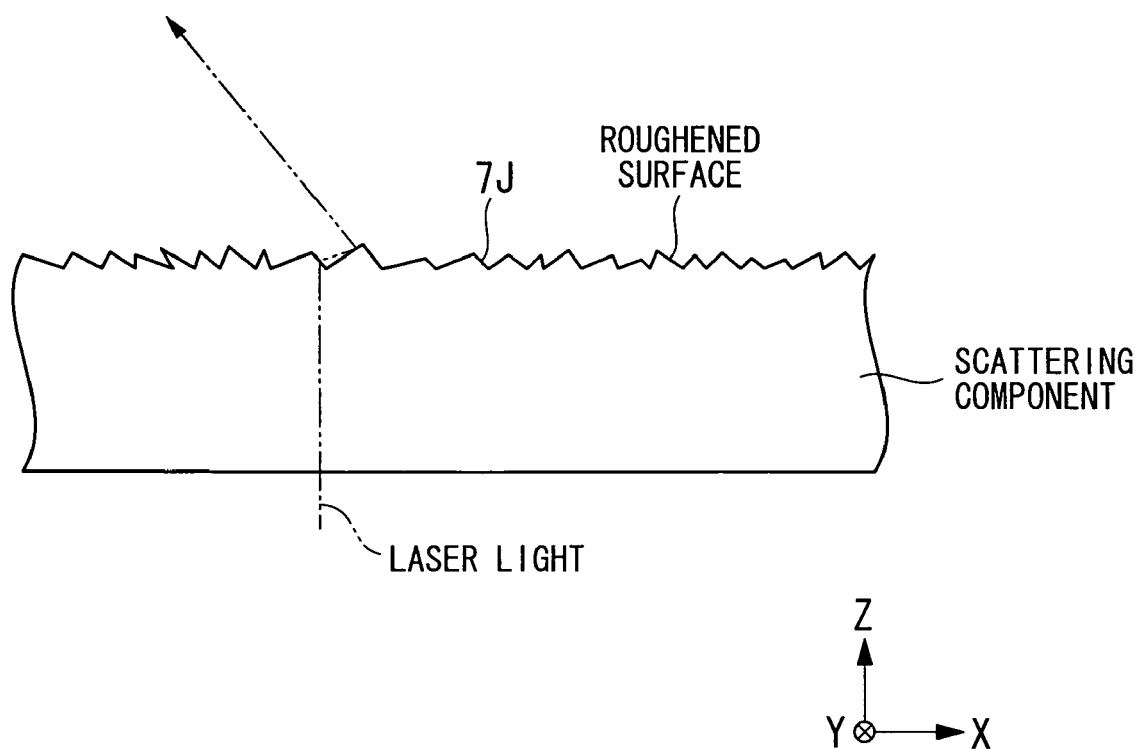
FIG. 11 is a schematic view showing an example of a scattering member.

For example, as is the case conventionally, when a scattering member having a roughened surface in order to scatter the laser light is used, as shown in schematic view in FIG. 11, the direction of travel of laser light emitted from a light emission face 7J is not controlled. Because of this, there is a possibility that laser light that has been emitted from the light emission face 7J will re-enter the light emission face 7J and repeat a cycle of leaving and re-entering the light emission face 7J.

In this case, the amount of laser light traveling from the scattering member toward the predetermined face 11 is attenuated.

In this embodiment, the laser light that has been emitted from the light emission face 7 is set so that it does not re-enter the light emission face 7. Because of this, it is possible to suppress the loss caused by a plurality of, or by refracting at one time or reflecting, and it is possible for this laser light to travel toward the predetermined face 11 without any reduction in the quantity thereof.

In addition, because the shape of the light emission face 7 is set so that the directions of travel of the laser light at a plurality of positions on the light emission face 7 (i.e., the grooves 7M) are mutually different, the laser light that is emitted from the light emission face 7 is excellently diffused while suppressing reduction in the quantity thereof.

The light emission face 7 of the diffusion optical element 8 of this embodiment includes the grooves 7M that extend in elongated lines in the Y axial direction, and are lined up in plurality in the X axial direction.

By providing the light emission face 7 with this kind of shape, the diffusion optical element 8 can be easily manufactured.

For example, by pressing a semi-spherical cutting tool against the surface of an optical component and then moving this cutting tool in one direction, the plurality of grooves 7M can be formed.

Moreover, in this embodiment, because the diffusion optical element 8 is rotated in at least the θZ direction using the driving device 12, it is possible to provide superior uniformity to the illumination distribution of at least that portion of the illumination area A2 on the predetermined face 11 that corresponds to the predetermined area A1.

Moreover, in this embodiment, because the light source device 1 includes a plurality of laser light sources 2, it is also possible to suppress the occurrence of speckle patterns.

A speckle pattern is a mottle-like pattern that spatially exhibits high levels of contrast when a diffusing face is illuminated with coherent light such as laser light and the diffused light therefrom is then monitored.

The diffused light that is generated at each point on a diffusing face generates mutual interference in random positional relationships, resulting in a complicated interference pattern being generated. There is thus a possibility that the predetermined face 11 will be illuminated by a non-uniform illumination distribution.

In this embodiment, the light source device 1 includes a plurality of laser light sources 2, and the laser light that is emitted from each of the plurality of light sources 2 is mutually incoherent. As a result, the predetermined face 11 is illuminated by light having mutually different illumination distributions (i.e., luminance distributions).

Because of this, by overlapping the irradiation light that is generated by the laser light from the respective laser light sources on the predetermined face 11, it is possible to reduce the occurrence of speckle patterns and make the illumination distribution on the predetermined face 11 substantially uniform.

Moreover, it is possible to further suppress the occurrence of speckle patterns using the diffusion optical element 8, and illuminate the predetermined face 11 with a substantially uniform illumination distribution.

In this embodiment, by mixing together on the predetermined face 11 the laser light that is emitted from each of positions on the light emitting surface 7 (i.e., the grooves 7M), the illumination distribution of the irradiation light on the predetermined face 11 is uniformized.

Accordingly, when, for example, there is a large level of non-uniformity in the illumination distribution on the predetermined face 11 that is caused by the luminance distribution of the laser light emitted from the light emission face 4 of the diffractive optical element 5 (i.e., when there is a high level of randomness), by enlarging the area where the laser light is mixed together, the illumination distribution on the predetermined face 11 can be uniformized.

In order to enlarge the area where the laser light is mixed together, it is sufficient to increase the emission angle θ1 from the diffusion optical element 8, or to lengthen the distance T or the like.

If the emission angle θ1 is increased, or the distance T is lengthened, then, of the laser light that is emitted from each of the plurality of positions on the light emission face 7, there is an increase in the number of components of the laser light that do not become mixed together with the other laser light at the predetermined face 11 and are irradiated onto the area A3 outside the predetermined area A1.

If there is an increase in the laser light that is irradiated onto the outside of the predetermined area A1, then this brings about a deterioration in the illumination efficiency and the like. Because of this, it is desirable to optimize the emission angle θ1 and the distance T and the like within a range that still allows the desired illumination distribution to be obtained in the predetermined area A1.

Second Embodiment

Next, the second embodiment of the invention will be described.

In the above described first embodiment, the light emission face 7 includes the grooves 7M that extend in elongated lines in the Y axial direction, and are lined up in plurality in the X axial direction, and these grooves 7M are formed in circular arc shapes that are depressed relative to the predetermined face 11 on the XZ plane, and boundaries between adjacent grooves 7M form protrusion-shaped ridge lines that protrude relative to the predetermined face 11.

The special feature of this embodiment lies in the fact that the light emission face 7 has curved recessed portions and protruding portions.

In the description given below, component portions that are identical to or equivalent to those in the above described embodiment are given the same descriptive symbols, and any description thereof is simplified or omitted.

Figure 12:
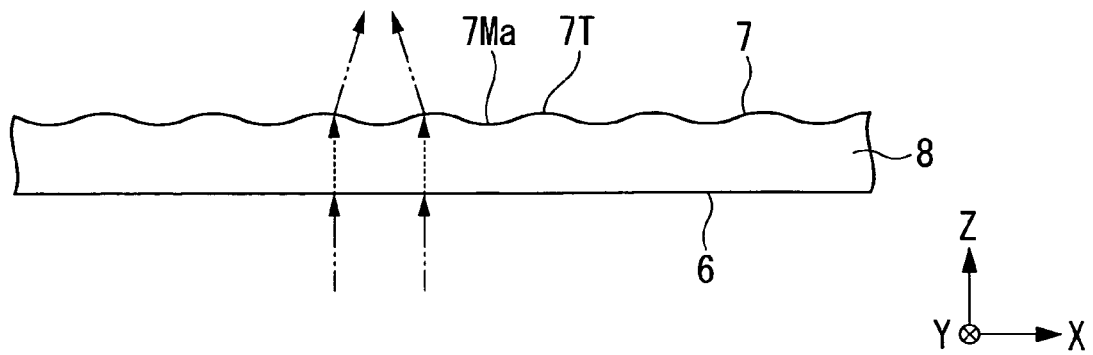
FIG. 12 is an enlarged side view showing a portion of a diffusion optical element according to a second embodiment.

FIG. 12 shows a diffusion optical element 8 according to the second embodiment.

In FIG. 12, the light emission face 7 includes arc-shaped recessed portions (grooves) 7Ma that, in a cross-section which is substantially perpendicular to this light emission face 7, are depressed relative to the predetermined face 11.

In the case of this embodiment, the recessed portions 7Ma correspond to the "unit structures" of the invention.

A plurality of the recessed portions 7Ma are formed in a predetermined direction in a surface which is substantially parallel to the light emission face 7.

In FIG. 12, the diffusive light emitting element 8 is positioned so that the incidence face 6, the light emission face 7, and an XY plane are all substantially parallel. The recessed portions 7Ma have an arc-shaped (i.e., a curved) surface relative to the predetermined face 11 on the XZ plane.

The recessed portions 7Ma are formed in elongated lines extending in the Y axial direction, and a plurality of the recessed portions 7Ma are formed in the X axial direction.

In this embodiment, protruding portions 7T that protrude toward the predetermined face 11 are formed between adjacent recessed portions 7Ma.

The protruding portions 7T have an arc-shaped (i.e., a curved) surface that protrudes toward the predetermined face 11 on the XZ plane.

The protruding portions 7T are formed in elongated lines extending in the Y axial direction, and a plurality of the protruding portions 7T are formed in the X axial direction between adjacent recessed portions 7Ma.

In this embodiment, the light emission face 7 includes an uneven structure that has a sine wave-shaped surface extending over the entire light emission face 7 on the XZ plane.

In this embodiment as well, laser light that has been emitted from the light emitting surface 7 does not re-enter the light emitting surface 7.

In this embodiment as well, it is possible to suppress any attenuation in the quantity of laser light (i.e., irradiation light) that reaches the predetermined face 11, and it is possible to illuminate the predetermined face 11 with a high level of illumination.

Third Embodiment

Next, the third embodiment of the invention will be described.

The special feature of this embodiment lies in the fact that the diffusion optical element 8 diffuses laser light by refracting it using the incidence face 6, and that the incidence face 6 has a shape that enables it to control the direction in which the laser light travels so that incident laser light travels toward the light emission face 7.

Figure 13:
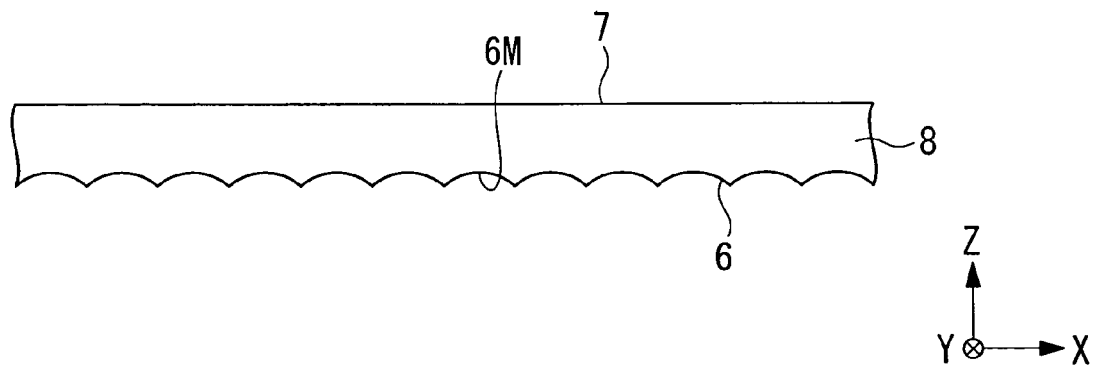
FIG. 13 is an enlarged side view showing a portion of a diffusion optical element according to a third embodiment.

FIG. 13 shows a diffusion optical element 8 according to the third embodiment.

In FIG. 13, the incidence face 6 of the diffusion optical element 8 has an uneven structure.

The incidence face 6 includes circular arc-shaped grooves 6M that, in a cross-section that is substantially perpendicular to the incidence face 6, are depressed relative to the laser light source 2.

In the case of this embodiment, the grooves 6M correspond to the "unit structures" of the invention.

A plurality of the grooves 6M are formed in a predetermined direction in a surface which is substantially parallel to the incidence face 6.

In FIG. 13, the diffusive light emitting element 8 is positioned so that the incidence face 6, the light emission face 7, and an XY plane are all substantially parallel.

The incidence face 6 has the circular arc-shaped grooves 6M that, on an XZ plane that is substantially perpendicular to this incidence face 6, are depressed relative to the laser light source 2.

The grooves 6M are formed in elongated lines extending in the Y axial direction, and a plurality of the grooves 6M are formed in the X axial direction.

Moreover, in this embodiment, the light emission face 7 is a surface which is substantially parallel to the XY plane.

The shape of the incidence face 6 is set so that the directions of travel of the laser light that is emitted from each of positions of the light emission face 7 (i.e., the grooves 6M) are mutually different.

The shape of the incidence face 6 is set so that laser light that has passed through the diffractive optical element 5 and the diffusion optical element 8 is incident into the predetermined area A1 of the predetermined face 11 at a predetermined incidence angle.

In this embodiment as well, as a result of laser light from the laser light source 2 being diffused by the diffusion optical element 8, it is possible to create irradiation light that is able to illuminate the predetermined face 11 with a uniform illumination distribution.

Because the diffusion optical element 8 diffuses laser light by refracting it using the incidence face 6, and because this incidence face 6 has a shape that allows it to control the direction of travel of the laser light so that the laser light travels toward the light emission face 7 and does not travel toward any areas other than the light emission face 7, it is possible to suppress any attenuation in the quantity of laser light (i.e., irradiation light) that reaches the predetermined face 11, and it is possible to illuminate the predetermined face 11 with a high level of illumination.

In this embodiment, it is also possible for the shape of the incidence face 6 to be a sine wave shape such as that of the light emission face 7 shown in FIG. 12.

Fourth Embodiment

Next, the fourth embodiment of the invention will be described.

Figure 14:
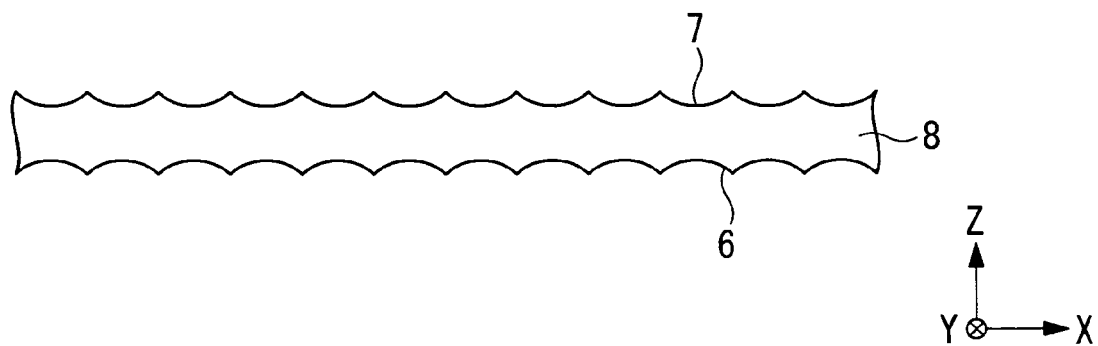
FIG. 14 is an enlarged side view showing a portion of a diffusion optical element according to a fourth embodiment.

FIG. 14 shows a diffusion optical element 8 according to the fourth embodiment.

As shown in FIG. 14, an uneven structure such as those described in the above embodiments may be provided on both the incidence face 6 and the light emission face 7.

By employing this type of structure, the light source device 1 is also able to suppress any attenuation in the quantity of laser light (i.e., irradiation light) that reaches the predetermined face 11, and illuminate the predetermined face with a high level of illumination.

Fifth Embodiment

Next, the fifth embodiment of the invention will be described.

The characteristic feature of this embodiment lies in the fact that an anti-reflection structure is provided on at least one of the incidence face 6 and the light emission face 7.

Figure 15:
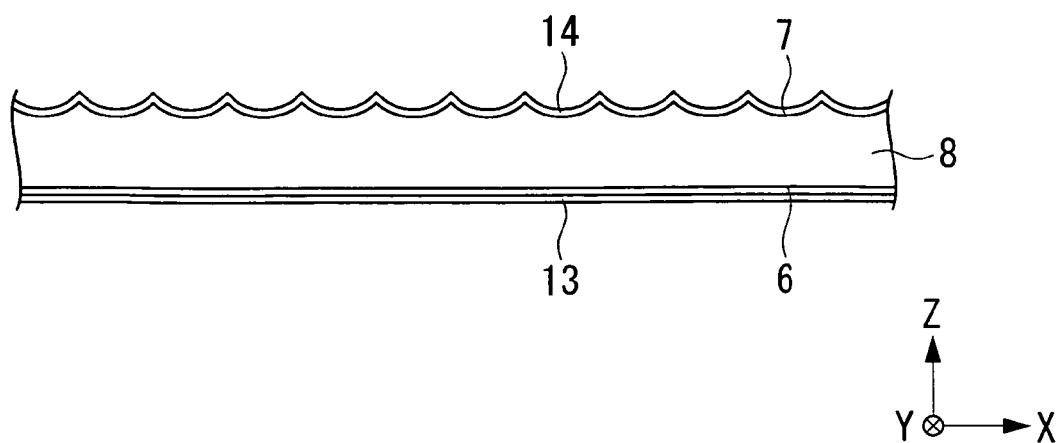
FIG. 15 is an enlarged side view showing a portion of the diffusion optical element according to a fifth embodiment.

FIG. 15 shows a diffusion optical element 8 according to the fifth embodiment.

In FIG. 15, the light source device 1 is provided with a first anti-reflection film 13 that is provided on the incidence face 6 of the diffusion optical element 8, and a second anti-reflection film 14 that is provided on the light emission face 7 thereof.

In this embodiment, the first anti-reflection film 13 is a multilayer film, and the second anti-reflection film 14 is a monolayer film.

The multilayer film may be, for example, a dielectric multilayer film.

The monolayer film may be formed, for example, from magnesium fluoride.

The first and second anti-reflection films 13 and 14 are interference-type anti-reflection films, and the first anti-reflection film 13 suppresses reflection of laser light that is incident into the incidence face 6, while the second anti-reflection film 14 suppresses reflection of laser light when it is emitted from the light emission face 7.

By providing anti-reflection films, it is possible to further suppress any attenuation in the quantity of laser light (i.e., irradiation light) that reaches the predetermined face 11, and it is possible to illuminate the predetermined face 11 with a superior level of illumination.

Note that in the description that uses FIG. 15, the first anti-reflection film 13 is a multilayer film, however, it may also be a monolayer film.

Moreover, in the description that uses FIG. 15, the second anti-reflection film 14 is a monolayer film, however, it may also be a multilayer film.

In addition, it is also possible to omit the first anti-reflection film 13 and provide the anti-reflection film 14 solely on the light emission face 7, or to omit the second anti-reflection film 14 and provide the anti-reflection film 13 solely on the incidence face 6.

Figure 16:
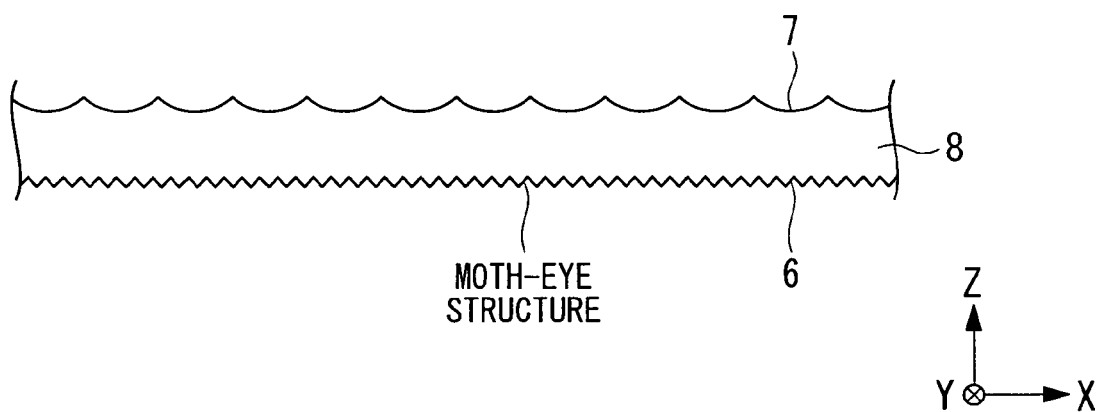
FIG. 16 is an enlarged side view showing a portion of the diffusion optical element according to the fifth embodiment.

Moreover, as shown in FIG. 16, it is also possible to prevent the reflection of laser light that is incident into the incidence face 6 by providing what is known as a moth-eye structure which is a structure in which, for example, a plurality of minute, conical projecting components are arranged cyclically on the incidence face 6.

It is also possible to form a moth-eye structure on the light emission face 7.

Sixth Embodiment

Next, the sixth embodiment of the invention will be described.

The characteristic feature of this embodiment lies in the fact that the uneven structure that is provided on the light emission face 7 has both recessed portions and protruding portions that are two-dimensionally and regularly arrayed along the XY plane that is substantially parallel to the light emission face 7.

Figure 17:
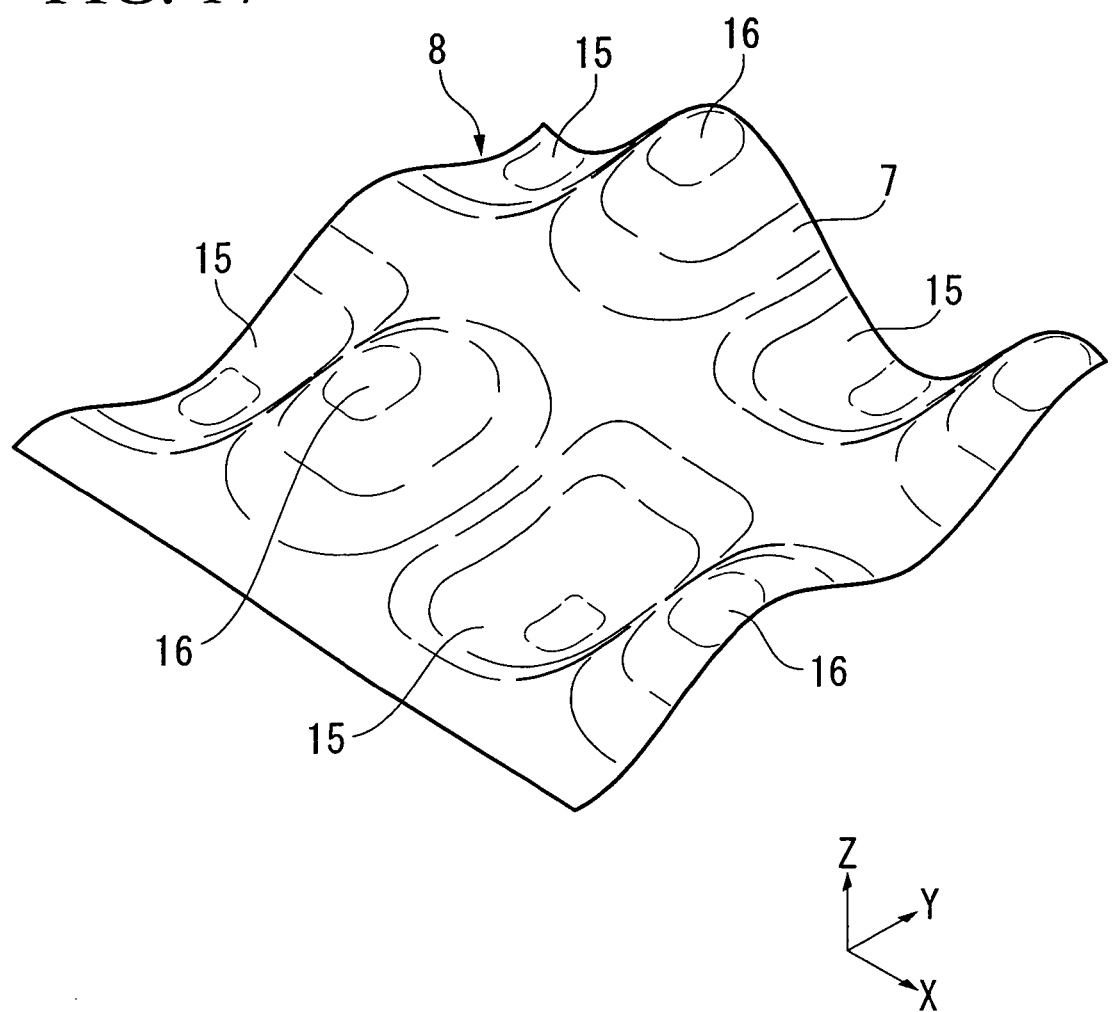
FIG. 17 is an enlarged perspective view showing a portion of the diffusion optical element according to a sixth embodiment.
Figure 18:
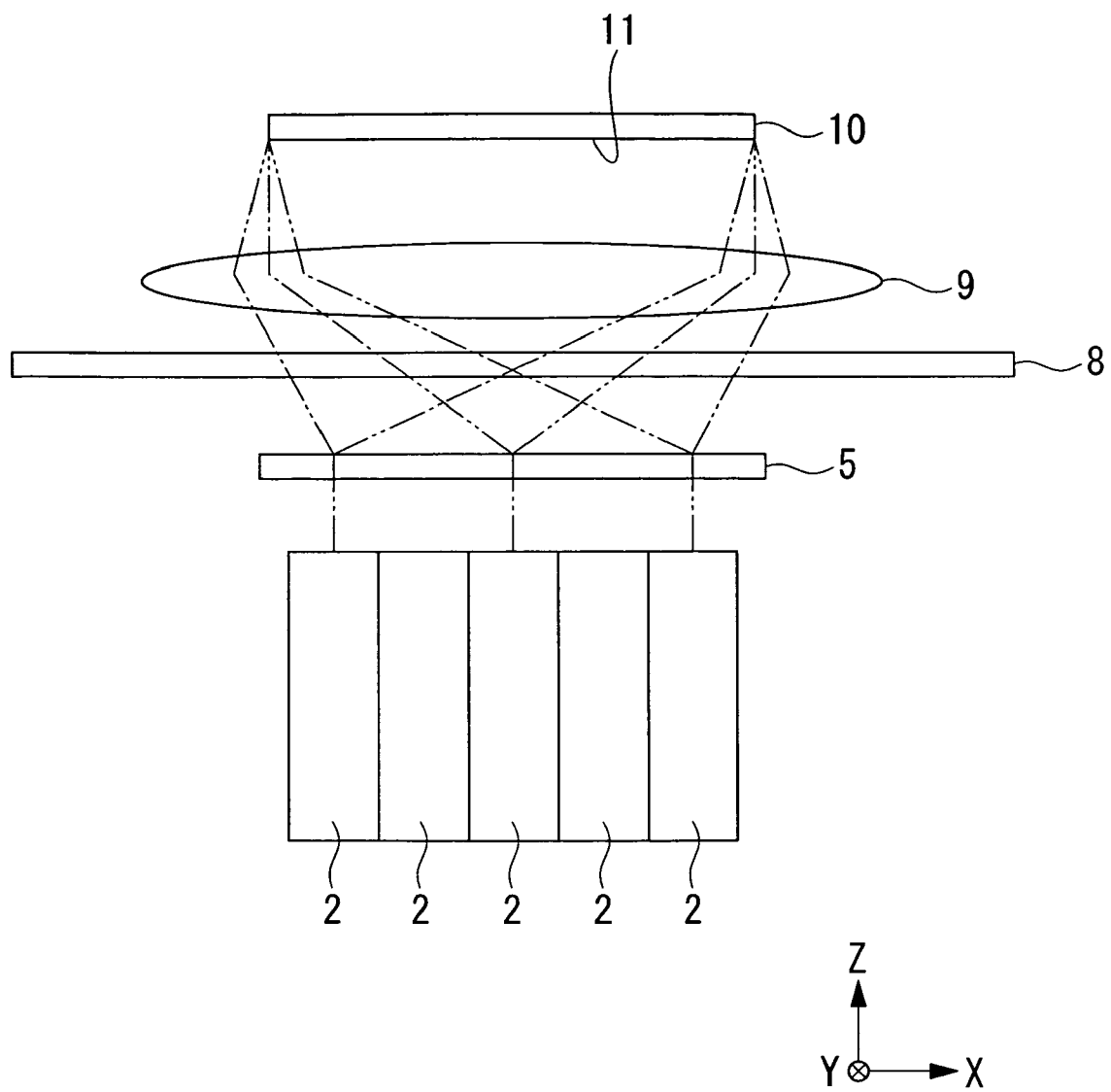
FIG. 18 is a schematic structural view showing a light source device according to the sixth embodiment.

FIG. 17 is a schematic structural view showing a light source device 1 according to the sixth embodiment. FIG. 18 is an enlarged perspective view showing a portion of the light emission face 7 according to the sixth embodiment.

As shown in FIG. 18, the uneven structure that is provided on the light emission face 7 of the diffusion optical element 8 has both recessed portions 15 and protruding portions 16 that are two-dimensionally and regularly arrayed along the XY plane that is substantially parallel to the light emission face 7.

Surfaces of the recessed portions 15 and the protruding portions 16 are curved.

In the case of this embodiment, the recessed portions 15 and the protruding portions 16 correspond to the "unit structures" of the invention.

In this embodiment as well, the light source device 1 is also able to suppress any attenuation in the quantity of laser light (i.e., irradiation light) that reaches the predetermined face 11, and illuminate the predetermined face with a high level of illumination.

Moreover, the diffusion optical element 7 is able to excellently diffuse laser light.

As a result, the light source device 1 is able to illuminate the predetermined face 11 with a uniform illumination distribution.

Moreover, in this embodiment, as shown in FIG. 18, even if the driving device 12 is omitted, the light source device 1 is still able to illuminate the predetermined face 11 with a uniform illumination distribution.

It is also to be understood that the diffusion optical element 8 of this embodiment may also be moved (i.e., rotated) by the driving device 12.

Note that in the above described first through sixth embodiments, the diffractive optical element 5 is located between the laser light source 2 and the diffusion optical element 8, the diffusion optical element 8 is located between the diffractive optical element 5 and the predetermined face 11, and the angle adjusting optical element 9 is located between the diffusion optical element 8 and the predetermined face 11, however, it is also possible for the positional relationships between the diffractive optical element 5, the diffusion optical element 8, and the angle adjusting optical element 9 to be altered.

Figure 19:
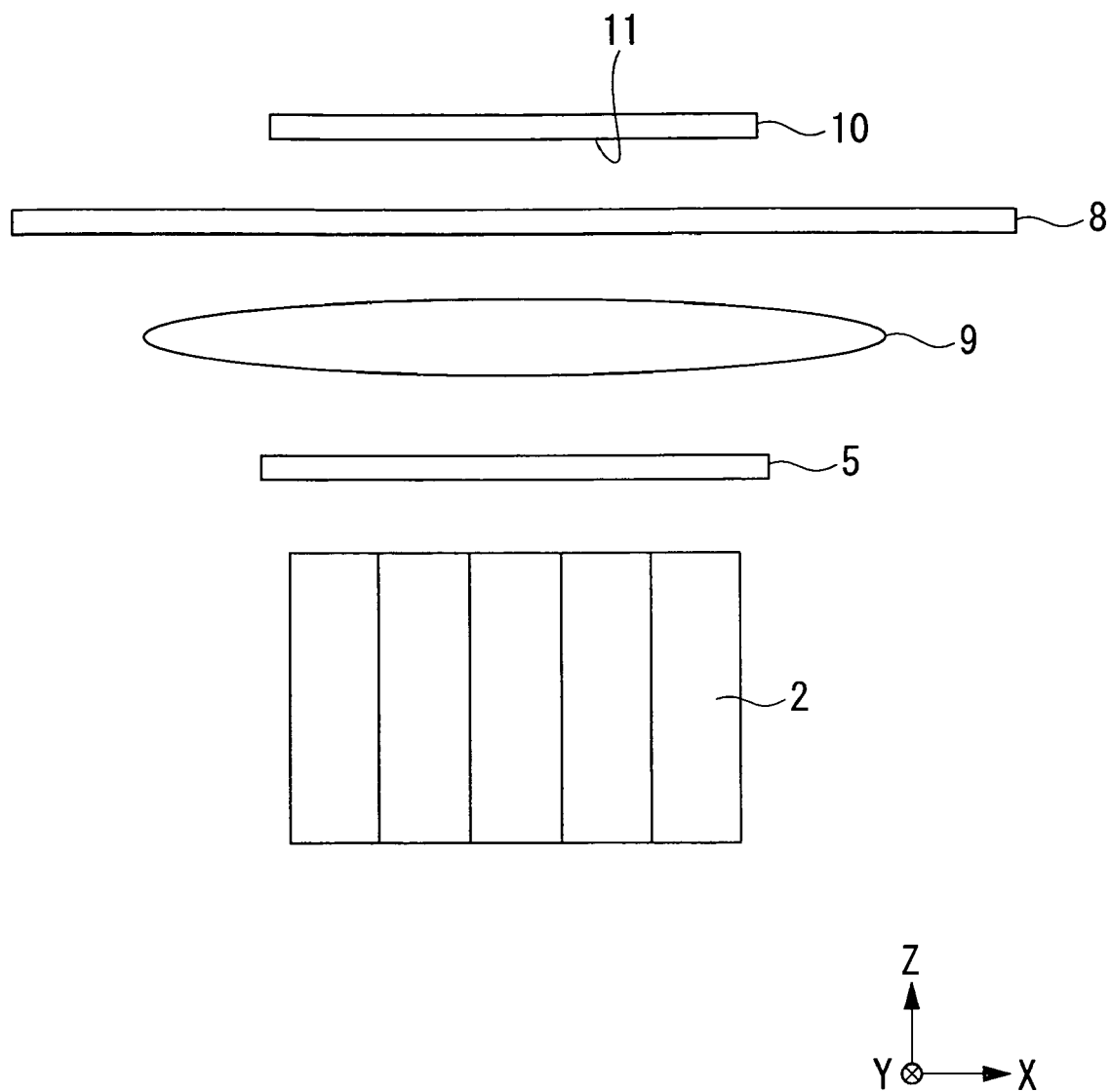
FIG. 19 is a schematic structural view showing a modified example of a light source device.

For example, as shown in FIG. 19, it is also possible for the diffractive optical element 5, the angle adjusting optical element 9, and the diffusion optical element 8, to be disposed in this order moving from the laser light source 2 toward the predetermined face 11 between the laser light source 2 and the predetermined face 11.

Figure 20:
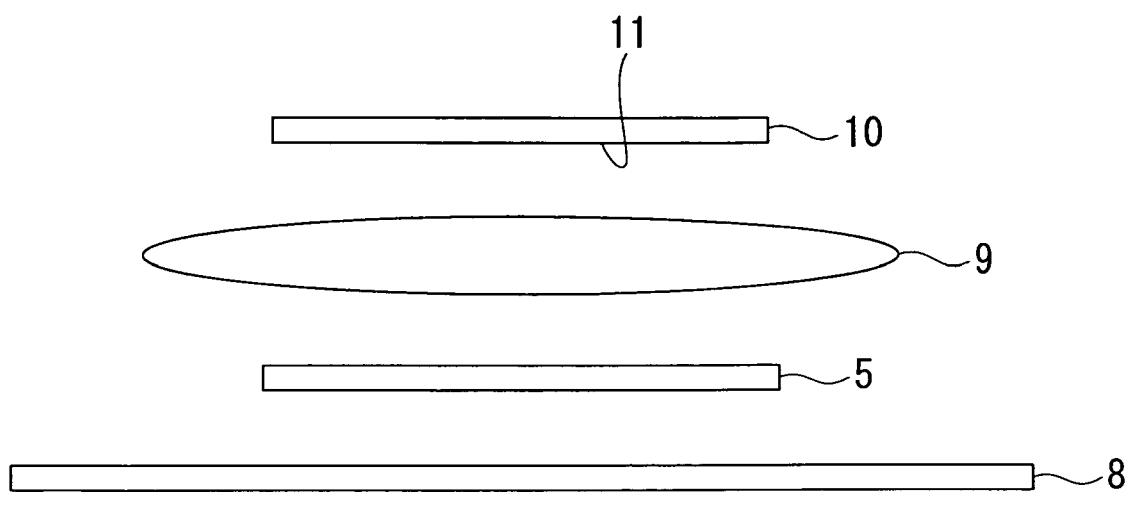
FIG. 20 is a schematic structural view showing a modified example of a light source device.
Figure 20:
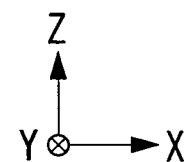

Moreover, as shown in FIG. 20, it is also possible for the diffusion optical element 8, the diffractive optical element 5, and the angle adjusting optical element 9 to be disposed in this order moving from the laser light source 2 toward the predetermined face 11 between the laser light source 2 and the predetermined face 11.

Figure 21:
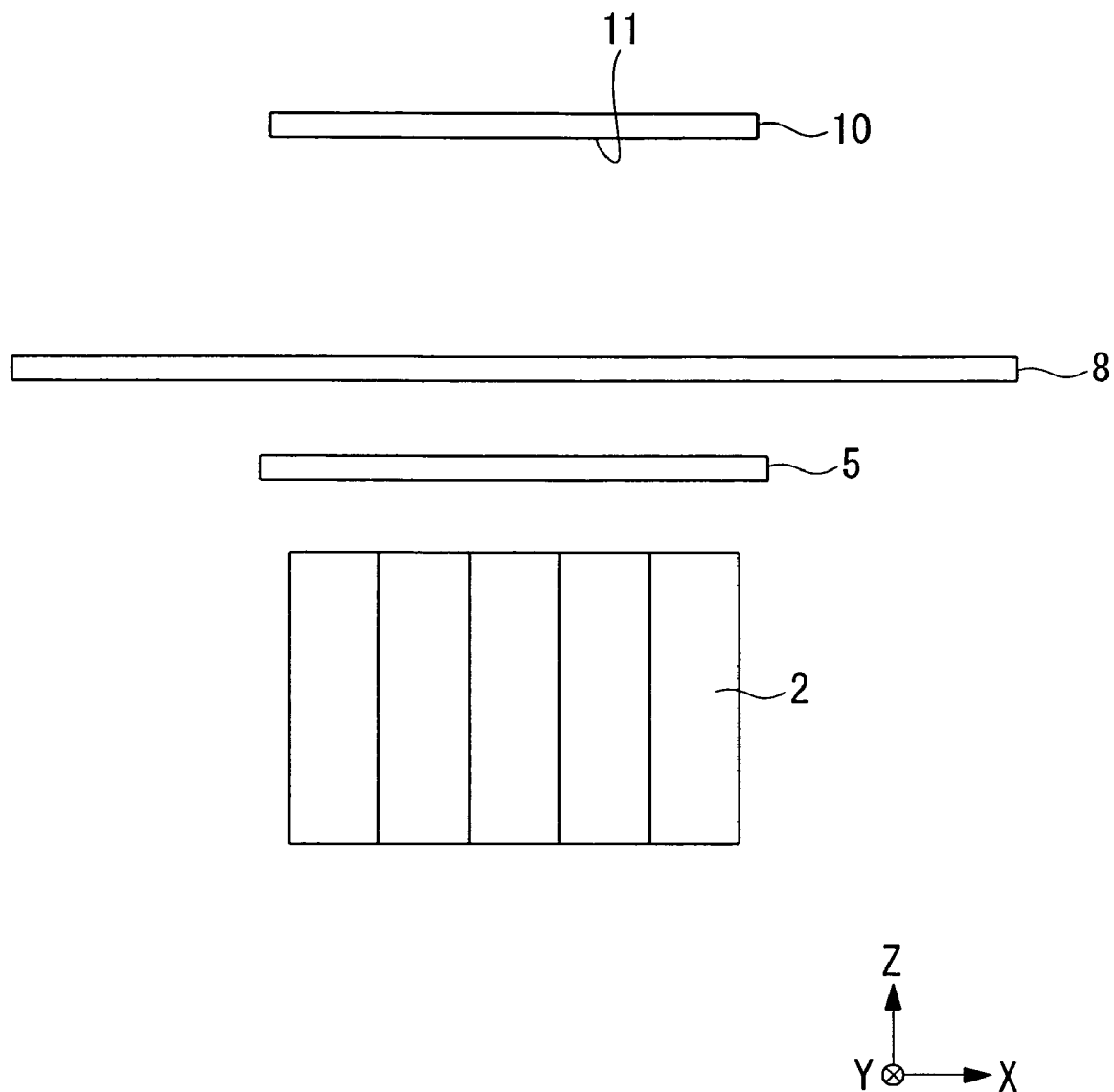
FIG. 21 is a schematic structural view showing a modified example of a light source device.

Furthermore, as shown in FIG. 21, it is also possible for the angle adjusting optical element 9 to be omitted.

In the example shown in FIG. 21, the diffractive optical element 5 and the diffusion optical element 8 are disposed in this order moving from the laser light source 2 toward the predetermined face 11 between the laser light source 2 and the predetermined face 11.

In the above described first through sixth embodiments, the light source device 1 has a plurality of laser light sources 2 that are lined up one-dimensionally (i.e., in the X axial direction), however, it may also be provided with laser light sources 2 that are arrayed in a pattern two-dimensionally (i.e., in the X and Y directions).

Note that in the above described first through sixth embodiments, the light source device 1 has a plurality of laser light sources 2, however, it is also possible for there to be only one laser light source 2.

Note that in the above described first through sixth embodiments, of transmission types of diffractive optical elements (i.e., diffraction gratings), a phase modulation type of diffractive optical element is used as the diffractive optical element, however, it is also possible for an amplitude modulation type of diffractive optical element to be used.

Moreover, the diffractive optical element is not limited to a transmission type diffractive optical element, and it is also possible for a reflective type of diffractive optical element to be used.

Moreover, it is also possible, for example, to employ a combination of a transmission type of diffractive optical element and a reflective type of diffractive optical element.

In addition, by optimizing the surface conditions of these diffractive optical elements, these diffractive optical elements can be furnished with the desired functions.

Here, a description will be given of an example of a procedure to design a concave-convex structure on an incidence face or light emission face of a diffusion optical element which forms the diffractive face.

Figure 25A:
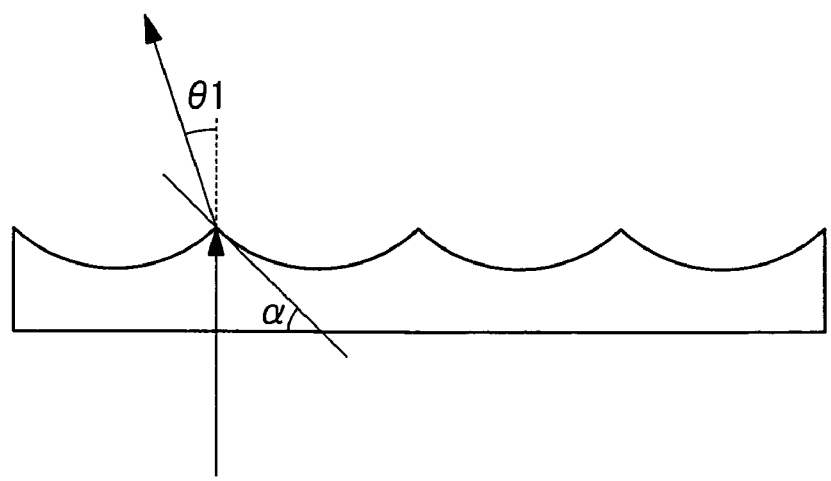
FIGS. 25A and 25B are side views illustrating a technique of designing the concavo-convex configuration of a diffusion optical element.
Figure 25B:
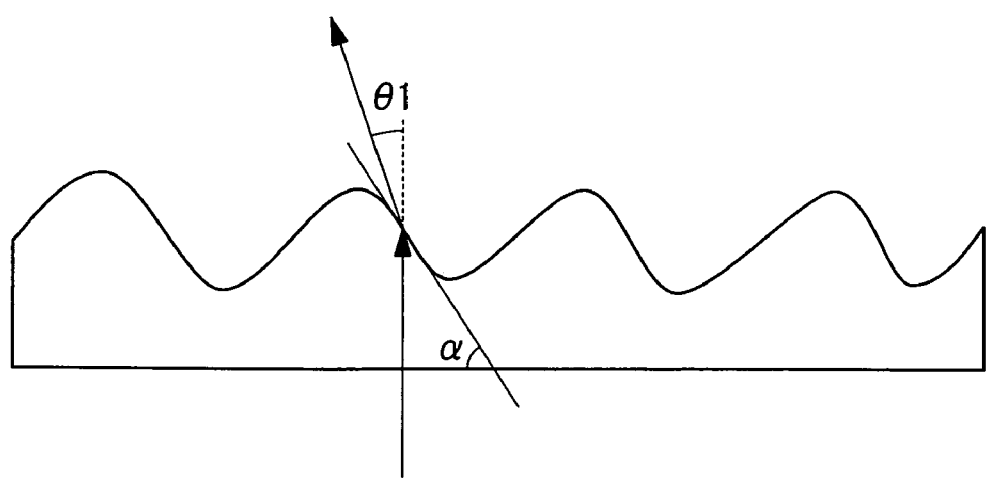
Figure 26A:
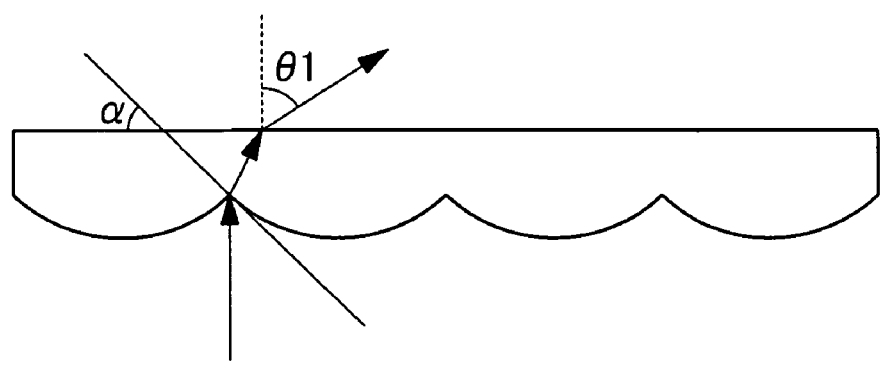
FIGS. 26A and 26B are side views illustrating a technique of designing the concavo-convex configuration of a diffusion optical element.
Figure 26B:
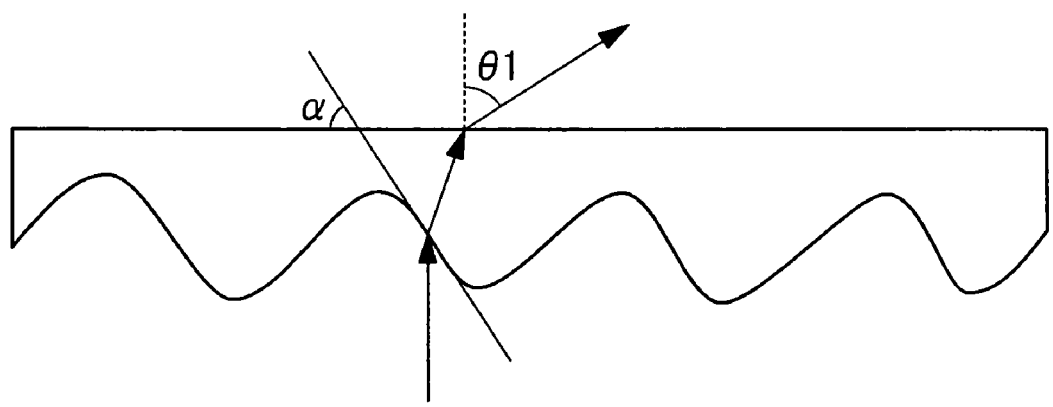

For example, in a shape in which arc-shaped grooves are formed in the light emitting surface of the diffusion optical element shown in FIG. 25A, and in the sine wave shape shown in FIG. 25B, and in the shape in which arc-shaped protruding portions are formed on an incidence face of the diffusion optical element shown in FIG. 26A, and in the sine wave shape shown in FIG. 26B, light that is perpendicularly incident into the diffusion optical element has a different emission angle depending on the incident position.

The emission angle is largest when the light is incident at a position where an between a tangent line of the uneven structure and a horizontal line is largest.

At this time, if a maximum emission angle of the light rays that are perpendicularly incident into the diffusion optical element is taken as "θ1", then in both a case in which the incidence face is flat such as shown in FIG. 25A and FIG. 25B, and a case in which the light emission face is flat such as shown in FIG. 26A and FIG. 26B, then θ1 can be determined by Formula (1) given below.

$$\theta 1 = \sin^{-1}(n \times \sin \alpha) - \alpha \quad (1)$$

wherein "n" is the refractive index of the diffusion optical element.

When the light rays are diffused at a predetermined face by a maximum distance d [mm] relative to the optical axis of the laser light, then the relationship shown in Formula (2) below is established relative to a distance T between the predetermined face and the diffusion optical element.

$$d = T \times \tan \theta 1 \quad (2)$$

Namely, if Formula (2) is transformed, then the emission angle θ1 required in order to diffuse the light by the maximum distance d can be determined by Formula (3) given below.

$$\theta 1 = \tan^{-1}(d/T) \quad (3)$$

Accordingly, if the angle α of the diffusion optical element is set so as to satisfy Formula (1) and Formula (3), then it is possible to achieve a diffusion optical element having the desired diffusion angle.

For example, in order to diffuse light within ±0.5 mm at a predetermined face, then if n is set to 1.49, the angle α is the same both when the incidence face is flat and when the light emission face is flat, and the conditions are satisfied when the angle α is approximately 2.3°.

In contrast, according to experiments performed by the inventors, results were obtained showing that attenuation of the laser light was satisfactorily suppressed and a high illumination was achieved when the emission angle θ1 was less than or equal to 1.2°.

Figure 27A:
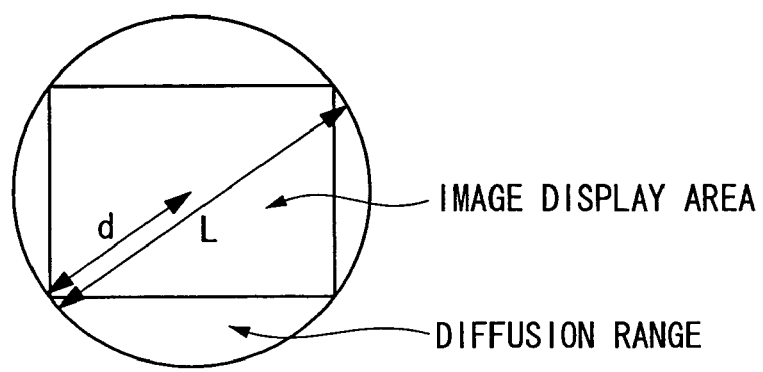
FIGS. 27A and 27B are schematic views illustrating a preferred light diffusion range.

Moreover, as shown in FIG. 27A, the light diffusion range created by the diffusion optical element is normally circular.

The "light diffusion range" shown here is a diffusion range for light that is incident into the center of an illumination area when no diffusion optical element has been provided.

Moreover, an image display area of a liquid crystal light valve (described below, normally, this is rectangular) is assumed as the illumination area on the predetermined face.

Here, if a radius of a circle showing the light diffusion range is taken as "d", and a length of diagonal lines of the rectangle of the image display area is taken as "L", then it is preferable for 2d≦L.

In this case, the circle showing the light diffusion range forms a circumscribing circle of the rectangle showing the image display area.

At this time, although there is a certain amount of light loss, it is possible to satisfactorily suppress loss in comparison with when a conventional diffusion plate which has a completely random scattering pattern is used.

Figure 27B:
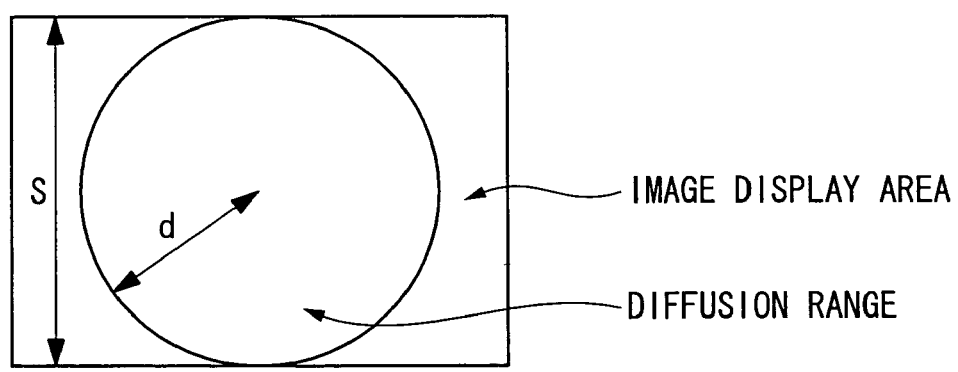

Furthermore, as shown in FIG. 27B, if the radius of the circle forming the light diffusion range created by the diffusion optical element is taken as "d", and the length of the short sides of the rectangle showing the image display area is taken as "S", then it is desirable for 2d≦S.

In this case, compared with FIG. 27A, it is possible to even more satisfactorily suppress light loss.

Seventh Embodiment

Next, the seventh embodiment of the invention will be described.

In this embodiment, a description is given of an example of an image display device that uses the light source device 1 described in each of the above embodiments.

Figure 22:
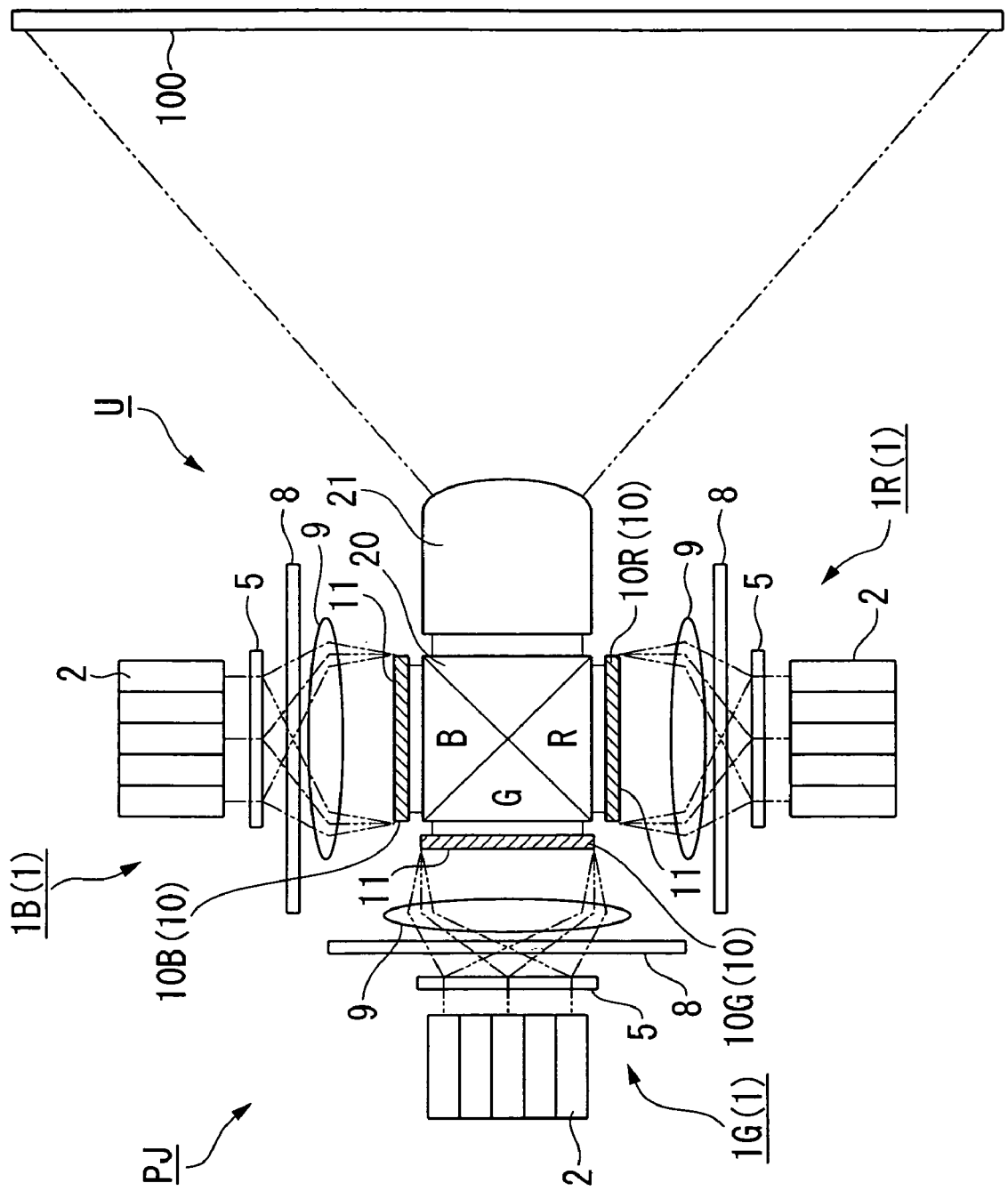
FIG. 22 is a schematic structural view showing an image display device according to a seventh embodiment.

FIG. 22 is a schematic structural view showing an image display device that is provided with the light source device 1 (i.e., 1R, 1G, 1B) described in each of the above embodiments.

In this embodiment, a projection type of image display device (i.e., projector) that projects colored light containing image information which has been created by a spatial light modulation device onto a screen via a projection system is described as an example of an image display device.

In FIG. 22, a projection type of image display device PJ is provided with a projection unit U that projects light which contains image information onto a screen 100 (i.e., a display screen).

As a result of light being projected from the projection unit U onto the screen 100, an image is formed on the screen 100.

The projection image display device PJ of this embodiment uses a projection type of screen as the screen 100, and projects light which contains image information onto the screen 100 from the front face side of the screen 100.

The projection unit U has a first light source device 1R which is capable of illuminating the predetermined face 11 with light of a first basic color (red light), a second light source device 1G which is capable of illuminating the predetermined face 11 with light of a second basic color (green light), and a third light source device 1B which is capable of illuminating the predetermined face 11 with light of a third basic color (blue light).

The projection unit U has an incidence face (i.e., a predetermined face) 11 which is illuminated by the first light source device 1R, and a first spatial light modulation device 10R which performs optical modulation on illuminated light in accordance with image information.

The projection unit U has an incidence face (i.e., a predetermined face) 11 which is illuminated by the second light source device 1G, and a second spatial light modulation device 10G which performs optical modulation on illuminated light in accordance with image information.

The projection unit U has an incidence face (i.e., a predetermined face) 11 which is illuminated by the third light source device 1B, and a third spatial light modulation device 10B which performs optical modulation on illuminated light in accordance with image information.

The projection unit U is provided with a color synthesis system 20 which synthesizes the light of the respective basic colors that has been modulated by the spatial light modulation devices 10R, 10G, and 10B, and a projection system 21 which projects the light generated by the color synthesis system 20 onto the screen 100.

Each of the spatial light modulation devices 10R, 10G, and 10B contains a liquid crystal device.

For convenience, in the following description, a "spatial light modulation device" is referred to as a "light valve".

A light valve is provided with an incidence side polarizing plate, a panel that has a liquid crystal sealed between a pair of glass substrates, and an emission side polarizing plate.

Pixel electrodes and orientation films are provided on the glass substrates.

The light valves constituting the spatial light modulation devices allow transmission only of light in predetermined oscillation directions, and the light of the basic colors that is incident into the light valves is optically modulated as it passes through them.

A plurality of light sources 2 of the first light source device 1R each emit red (R) laser light.

The first light source device 1R illuminates the incidence face 11 of the first light valve 10R based on the red laser light.

A plurality of light sources 2 of the second light source device 1G each emit colored (G) laser light.

The second light source device 1G illuminates the incidence face 11 of the second light valve 10G based on the green laser light.

A plurality of light sources 2 of the third light source device 1B each emit blue (B) laser light.

The third light source device 1B illuminates the incidence face 11 of the third light valve 10B based on the blue laser light.

The light of the respective basic colors which is modulated by passing through the light valves 10R, 10G, and 10B (i.e., modulated light) is synthesized by the color synthesis system 20.

The color synthesis system 20 is formed by a dichroic prism, and the red light (R), the green light (G), and the blue light (B) are synthesized by the color synthesis system 20 into full-color synthesized light.

The full-color synthesized light emitted from the color synthesis system 20 is supplied to the projection system 21.

The projection system 21 projects the full-color synthesized light onto the screen 100.

The projection system 21 is what is known as an enlargement system which enlarges the image on the incidence side and projects it onto the screen 100.

The projection unit U uses the projection system 21 to project the full-color synthesized light, which contains image information transmitted via the respective light valves 10R, 10G, and 10B which are illuminated respectively by the illumination devices 1R, 1G, and 1B, onto the screen 100. As a result, a full-color image is formed on the screen 100.

An observer views the image that has been projected onto the screen 100 via the projection unit U.

The respective light valves 10R, 10G, and 10B of the projector PJ of this embodiment have a high level of illumination due to the respective light source devices 1R, 1G, and 1B which have excellent illumination efficiency, and are illuminated by irradiation light having a uniform illumination distribution.

Accordingly, the projector PJ is able to display a superior image having a high level of contrast.

Moreover, as was described with reference to FIG. 10 and the like, there are cases in which dispersion (i.e., irregularities) occurs in the luminance of the laser light that is emitted from the light emission face 4 of the diffractive optical element 5 that is caused by the processing and the like when the diffractive optical element 5 is being manufactured.

If an image is displayed on the screen 100 by the projector PJ while this state in which irregularities are occurring in the luminance is left uncorrected, then because the image is enlarged by the projection system 21, there is a possibility that the luminance irregularities that are caused by the diffractive optical system 5 will increase until they are noticeable to an observer.

In this embodiment, because any luminance irregularities are corrected by the diffusion optical element 8, it is possible to suppress the above described disadvantages.

Note that in this embodiment, the incidence faces 7 of the diffusion optical elements 8 of the respective light source devices 1R, 1B, and 1G are shaped so that the emission angle $\theta1$ (i.e., the incidence angle $\theta2$) is between $-2°$ and $+2°$.

As a result, light is irradiated in the desired state onto the respective light valves 10R, 10G, and 10B, and the projector PJ is able to display a superior image.

Note that in the description which employed FIG. 22, a front projection type of projector that projects light that contains image information onto the screen 100 from the front surface side of the screen 100 is used as an example, however, it is also possible to use the light source device 1 of each of the embodiments described above in what is known as a rear projector that has a projection unit U, a screen 100, and a housing, and in which the projection unit U is positioned on the rear surface side of the screen 100, and that projects light containing image information onto the screen 100 from the rear surface side of the screen 100.

Note that in each of the above described embodiments, a transmission type of liquid crystal device (i.e., light valve) is used as a spatial light modulation device, however, it is also possible to use a reflective type of liquid crystal device, and a reflective light modulation device (i.e., a mirror modulation device) such as, for example, a DMD (Digital Micromirror Device) may also be used.

Note that the projector PJ of the above described embodiment has a first, a second, and a third light source device 1R, 1G, and 1B that each have a laser light source 2 capable of emitting light in one of the respective basic colors (i.e., R, G, and B). However, the invention is not limited to this structure, and it is also possible to employ a structure having a single light source device that has a structure in which a red laser light source that emits red light (R), a green laser light source that emits green light (G), and a blue laser light source that emits blue light (B) are arranged in an array formation.

In this case, operations of the light valves are controlled by performing laser light emitting operations of the laser light sources that are able to emit light in the respective basic colors in time division, and then synchronizing these laser light emitting operations of the respective laser light sources. As a result, it is possible to display a full-color image on the screen 100 using a single light source device and a single light valve.

In the projector of the above described embodiments, a spatial light modulation device is illuminated using the light source device 1, and an image is displayed on the screen 100 using the light that has passed through this spatial light modulation device, however, it is not necessary to use a spatial light modulation device as the image display device (i.e., projector).

For example, it is also possible to use the light source device 1 of each of the above described embodiments in what is known as a slide projector that illuminates the face of a slide (i.e., posi-film) which contains image information using the light source device 1 so as to project light which contains image information onto a screen.

Moreover, as the image display device it is also possible to use a direct view type of image display device in which images of a spatial light modulation device are viewed directly without any projection system being provided.

Eighth Embodiment

Next, the eighth embodiment of the invention will be described.

In this embodiment, a description is given of an example of an image display device that uses the light source device 1 described in each of the above embodiments.

Figure 23:
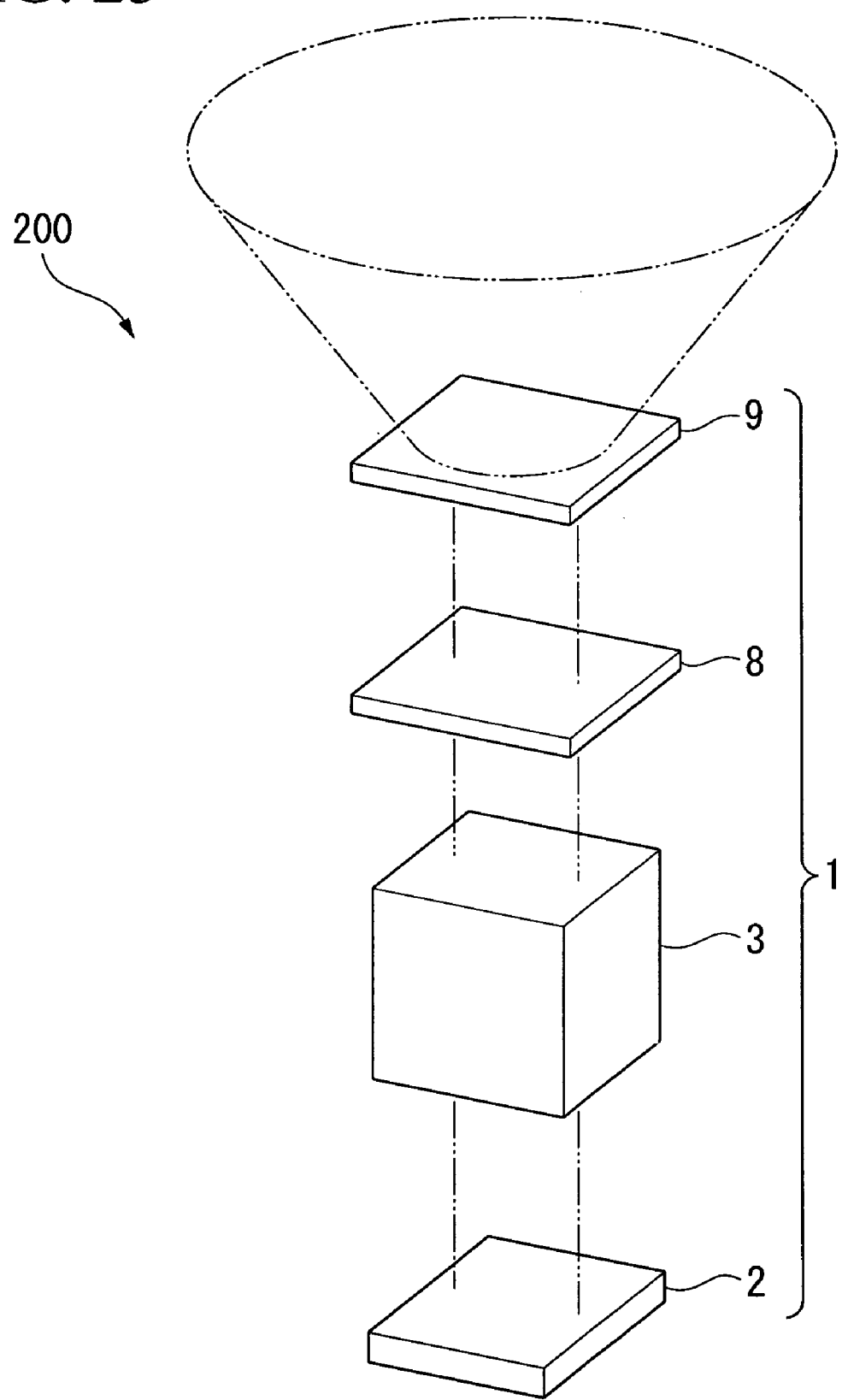
FIG. 23 is a schematic structural view showing an illumination device according to an eighth embodiment.

FIG. 23 is a schematic structural view showing an illumination device 200 according to this embodiment.

As shown in FIG. 23, the illumination device 200 is provided with the light source device 1 described in each of the above embodiments.

According to the illumination device 200 that is constructed in the manner described above, because the light source device 1 which provides a desired amount of light and has an extended lifespan is provided, it is possible to achieve a reduction in power consumption and an extension of the lifespan in the illumination device 200 as well.

Ninth Embodiment

Next, the ninth embodiment of the invention will be described.

In this embodiment, a description is given of an example of a monitor device that uses the light source device 1 described in each of the above embodiments.

Figure 24:
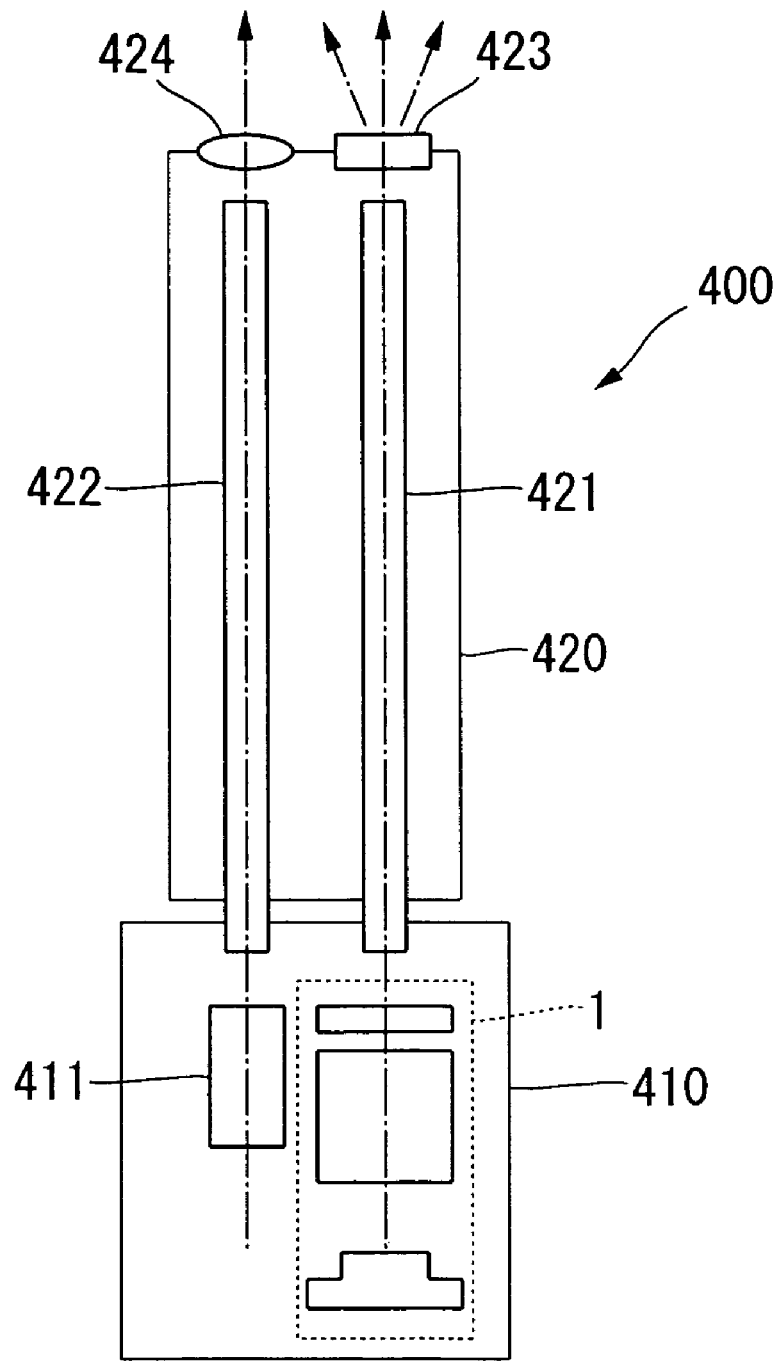
FIG. 24 is a schematic structural view showing a monitor device according to a ninth embodiment.

FIG. 24 is a schematic structural view showing a monitor device 400 according to this embodiment.

In FIG. 24, the monitor device 400 is provided with a device main unit 410, and a light transmission portion 420.

The device main unit 410 is provided with the light source device 1 described in each of the above embodiments.

The light transmission portion 420 is provided with two light guides 421 and 422, with one light guide located on the light transmitting side and one light guide located on the light receiving side.

The respective light guides 421 and 422 are formed by bundling together a large number of optical fibers and are able to transmit laser light over long distances.

The light source device 1 is disposed on the irradiation side of the light guide 421 which is on the light transmitting side, and a diffusion plate 423 is disposed on the light emitting side thereof.

Laser light that is emitted from the light source device 1 passes through the light guide 421 and is sent to the diffusion plate 43 that is provided at a distal end of the light transmission portion 420. This light is then diffused by the diffusion plate 423 and is irradiated onto a subject.

An imaging lens 424 is also provided on the distal end of the light transmission portion 420, and reflected light from the subject can be received by the imaging lens 424.

This received reflected light passes through the receiving side light guide 422, and is sent to an image pickup device in the form of a camera 411 that is provided inside the device main unit 410.

As a result, an image that is based on reflected light obtained by illuminating a subject with laser light emitted from the light source device 1 can be picked up by the camera 411.

According to the monitor device 400 that is constructed in the manner described above, because it is possible to illuminate a subject using the light source device 1, it is possible to increase the brightness of a captured image obtained by the camera 411.

Note that the light source device 1 described in each of the above embodiments can also be used as a light source in a laser processing machine.

While preferred embodiments of the invention have been described and illustrated above, it should be understood that these are exemplary of the invention and are not to be considered as limiting. Additions, omissions, substitutions, and other modifications can be made without departing from the spirit or scope of the invention. Accordingly, the invention is not to be considered as limited by the foregoing description and is only limited by the scope of the appended claims.

What is claimed is:

1. A light source device that generates irradiation light that is irradiated onto a predetermined face, the light source device comprising:
    a laser light source that emits laser light;
    a diffractive optical element that is located between the laser light source and the predetermined face, and that diffracts the laser light;
    a diffusion optical element that is located between the laser light source and the predetermined face, that is located between the diffractive optical element and the predetermined face, that has an incidence face into which the laser light is incident and a light emission face from which the laser light from the incidence face is emitted, and that diffuses the laser light; and
    unit structures that are two-dimensionally arrayed on at least one of the incidence face and the light emission face of the diffusion optical element, and that cause the light which is perpendicularly incident into the diffusion optical element to refract at one time, and then emit this light toward the predetermined face, wherein
    the laser light from the diffractive optical element is incident into the incidence face of the diffusion optical element.

2. The light source device according to claim 1, wherein the shape of the unit structures is set so that directions of travel of the laser light that is emitted from each of positions of the unit structure are mutually different.

3. The light source device according to claim 2, wherein the shape of the unit structures is set so that the laser light that has passed through the diffractive optical element and the diffusion optical element is incident at a predetermined incidence angle into a predetermined area of the predetermined face.

4. The light source device according to claim 1, wherein the unit structures include at least one of recessed portions and protruding portions.

5. The light source device according to claim 4, wherein the unit structures include at least one of recessed portions and protruding portions that are two-dimensionally and regularly arrayed along a face which is substantially parallel to the light emission face.

6. The light source device according to claim 4, wherein the unit structures include at least one of recessed portions and protruding portions whose surfaces are shaped as curved surfaces.

7. The light source device according to claim 4, wherein the unit structures include arc-shaped grooves which are depressed relative to the predetermined face in a cross-sectional view which is substantially perpendicular to the light emission face, and the grooves are formed in a predetermined direction of the face that is substantially perpendicular to the light emission face.

8. The light source device according to claim 1, wherein
the diffusion optical element diffuses laser light by refracting the laser light at the incidence face, and
the incidence face has a shape that controls the direction of travel of the laser light so that the post-incident laser light travels toward the light emission face.

9. An image display device in which
irradiation light is radiated from the light source device according to claim 1, and an image is displayed by light that has passed through the predetermined face, wherein
the predetermined face includes an incidence face of a spatial light modulation device that optically modulates the irradiated light in accordance with image signals.

10. A projector comprising:
the image display device according to claim 9;
a display screen; and
a projection system that projects onto the display screen light that contains image information and has passed through the predetermined face.

11. An illumination device comprising:
the light source device according to claim 1.

12. A monitor device comprising:
the light source device according to claim 1.

13. A light source device that generates irradiation light that is irradiated onto a predetermined face, the light source device comprising:
a laser light source that emits laser light;
a diffractive optical element that is located between the laser light source and the predetermined face, and that diffracts the laser light;
a diffusion optical element that is located between the laser light source and the predetermined face, that is located between the diffractive optical element and the predetermined face, that has both an incidence face into which the laser light is incident and which has a shape that controls the direction of travel of the laser light so that the post-incident laser light travels toward a light emission face, and the light emission face from which the laser light from the incidence face is emitted, and that diffuses the laser light by refracting the laser light at the incidence face, wherein
the laser light from the diffractive optical element is incident into the incidence face of the diffusion optical element.

14. A projector comprising:
the image display device according to claim 13;
a display screen; and
a projection system that projects onto the display screen light that contains image information and has passed through the predetermined face.

15. A light source device that generates irradiation light that is irradiated onto a predetermined face, the light source device comprising:
a laser light source that emits laser light;
a diffractive optical element that is located between the laser light source and the predetermined face, and that diffracts the laser light; and
a diffusion optical element that is located between the laser light source and the predetermined face, that is located between the diffractive optical element and the predetermined face, that has an incidence face into which the laser light is incident and a light emission face from which the laser light from the incidence face is emitted, and that diffuses the laser light, wherein
unit structures that include at least one of recessed portions and protruding portions whose surfaces are shaped as curved surfaces and that are two-dimensionally arrayed on at least one of the incidence face and the light emission face of the diffusion optical element, and
the laser light from the diffractive optical element is incident into the incidence face of the diffusion optical element.

16. The light source device according to claim 15, wherein
an angle between an optical axis of light that is emitted from the light emission face of the diffusion optical element and a normal line of the light emission face is less than or equal to 1.2°.

17. The light source device according to claim 15, wherein
if a radius of a circle forming a diffusion range of the light which is created by the diffusion optical element is taken as "d", and if a length of a diagonal line of a rectangle forming an illumination area on the predetermined face is taken as "L", then a formula $2d \leq L$ is satisfied for light that is incident into a center of the illumination area on the predetermined face when the diffusion optical element is not provided.

18. The light source device according to claim 17, wherein
if a radius of a circle forming a diffusion range of the light which is created by the diffusion optical element is taken as "d", and if a length of a short side of a rectangle forming an illumination area on the predetermined face is taken as "S", then a formula $2d \leq S$ is satisfied for light that is incident into a center of the illumination area on the predetermined face when the diffusion optical element is not provided.

19. A projector comprising:
the image display device according to claim 18;
a display screen; and
a projection system that projects onto the display screen light that contains image information and has passed through the predetermined face.

* * * * *